United States Patent [19]
Aoyama et al.

[11] Patent Number: 5,388,132
[45] Date of Patent: Feb. 7, 1995

[54] NUCLEAR FUEL ASSEMBLY AND CORE

[75] Inventors: Motoo Aoyama; Yasunori Bessho, both of Mito; Junichi Yamashita, Hitachi; Katsumasa Haikawa, Ibaraki; Hajime Umehara, Katsuta; Osamu Yokomizo, Ibaraki; Hideo Soneda; Mitsunari Nakamura, both of Hitachi, all of Japan

[73] Assignee: Hitachi, Ltd., Tokyo, Japan

[21] Appl. No.: 121,898

[22] Filed: Sep. 16, 1993

[30] Foreign Application Priority Data

Sep. 18, 1992 [JP] Japan ................. 4-249454

[51] Int. Cl.⁶ .......................................... G21C 3/328
[52] U.S. Cl. ................................................. 376/435
[58] Field of Search ................. 376/435, 428, 419

[56] References Cited

U.S. PATENT DOCUMENTS

| | | | |
|---|---|---|---|
| 4,926,450 | 5/1990 | Masuhara et al. | 376/444 |
| 5,176,877 | 1/1993 | Nakajima et al. | 376/435 |
| 5,198,186 | 3/1993 | Ogiya et al. | 376/435 |
| 5,249,211 | 9/1993 | Nagano et al. | 376/435 |

FOREIGN PATENT DOCUMENTS

| | | |
|---|---|---|
| 62-118297 | 5/1987 | Japan . |
| 63-73187 | 4/1988 | Japan . |
| 63-133086 | 6/1988 | Japan . |
| 64-28587 | 1/1989 | Japan . |

Primary Examiner—Daniel D. Wasil
Attorney, Agent, or Firm—Antonelli, Terry, Stout & Kraus

[57] ABSTRACT

A mean uranium enrichment of fuel rods is set to not less than 4 wt% and preferably 4.25%, a percentage in number of Gd rods to all the fuel rods is set in the range of 20 to 30% and preferably 23%, and an enrichment 4.45 wt% of the Gd rods is between a pellet maximum uranium enrichment and a pellet minimum uranium enrichment. A percentage in number of those fuel rods having a maximum uranium enrichment of 5.0% to all the fuel rods except the Gd rods is set to not less than 75% and preferably 82%. A mean uranium enrichment in the enriched fuel section except blanket regions at upper and lower end portions is 4.75 wt% and a ratio $e_{max}/e_{mean}$ of the pellet maximum uranium enrichment to that mean uranium enrichment is not larger than 1.16 and preferably 1.105. Accordingly, when the maximum uranium enrichment is limited to 5.0 wt%, the mean uranium enrichment can be raised to attain mean discharged exposure not less than 45 GWd/t without causing any problems in gadolinia containing fuel rods.

21 Claims, 19 Drawing Sheets

FIG. 1(a)
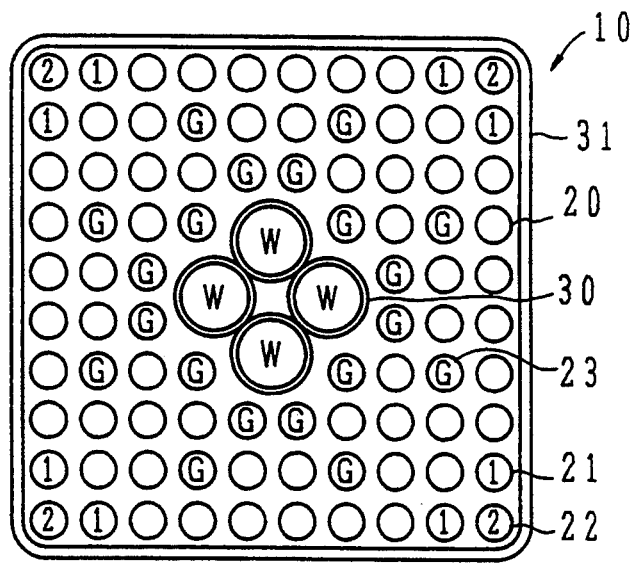
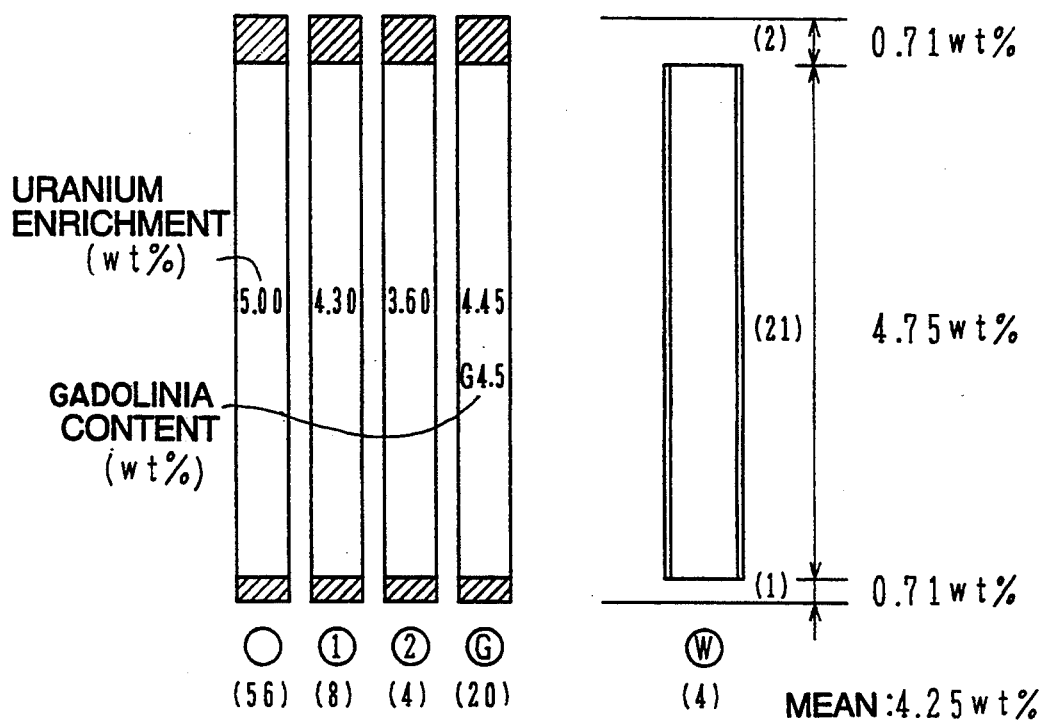
FIG. 1(b)    FIG. 1(c)

FIG. 7(a)

EXPOSURE 0.0Gwd/t

| 1.510 | 1.411 | 1.372 | 1.253 | 1.219 | 1.219 | 1.254 | 1.374 | 1.412 | 1.513 |
|---|---|---|---|---|---|---|---|---|---|
| 1.411 | 1.214 | 1.029 | 0.467 | 0.881 | 0.881 | 0.468 | 1.030 | 1.215 | 1.415 |
| 1.372 | 1.029 | 0.901 | 0.826 | 0.447 | 0.447 | 0.826 | 0.903 | 1.031 | 1.380 |
| 1.253 | 0.467 | 0.825 | 0.515 | 0.0 | 0.0 | 0.516 | 0.827 | 0.463 | 1.266 |
| 1.219 | 0.881 | 0.447 | 0.0 | 0.0 | 0.0 | 0.0 | 0.447 | 0.885 | 1.228 |
| 1.219 | 0.881 | 0.447 | 0.0 | 0.0 | 0.0 | 0.0 | 0.447 | 0.885 | 1.228 |
| 1.254 | 0.468 | 0.826 | 0.516 | 0.0 | 0.0 | 0.516 | 0.828 | 0.463 | 1.266 |
| 1.374 | 1.030 | 0.903 | 0.827 | 0.447 | 0.447 | 0.828 | 0.905 | 1.033 | 1.381 |
| 1.412 | 1.215 | 1.031 | 0.463 | 0.885 | 0.885 | 0.463 | 1.033 | 1.217 | 1.416 |
| 1.513 | 1.415 | 1.380 | 1.266 | 1.228 | 1.228 | 1.266 | 1.381 | 1.416 | 1.516 |

FIG. 7(b)

EXPOSURE 13.2Gwd/t

| 1.108 | 1.101 | 1.124 | 1.094 | 1.074 | 1.074 | 1.094 | 1.125 | 1.100 | 1.109 |
|---|---|---|---|---|---|---|---|---|---|
| 1.101 | 1.026 | 0.959 | 0.815 | 0.946 | 0.946 | 0.815 | 0.959 | 1.025 | 1.102 |
| 1.124 | 0.959 | 0.926 | 0.966 | 0.888 | 0.888 | 0.966 | 0.927 | 0.958 | 1.125 |
| 1.094 | 0.815 | 0.966 | 1.006 | 0.0 | 0.0 | 1.006 | 0.966 | 0.814 | 1.096 |
| 1.074 | 0.946 | 0.888 | 0.0 | 0.0 | 0.0 | 0.0 | 0.888 | 0.944 | 1.074 |
| 1.074 | 0.946 | 0.888 | 0.0 | 0.0 | 0.0 | 0.0 | 0.888 | 0.944 | 1.074 |
| 1.095 | 0.815 | 0.966 | 1.006 | 0.0 | 0.0 | 1.006 | 0.966 | 0.814 | 1.096 |
| 1.125 | 0.959 | 0.927 | 0.966 | 0.888 | 0.888 | 0.966 | 0.927 | 0.958 | 1.125 |
| 1.100 | 1.025 | 0.958 | 0.814 | 0.944 | 0.944 | 0.814 | 0.958 | 1.023 | 1.101 |
| 1.109 | 1.102 | 1.125 | 1.095 | 1.074 | 1.074 | 1.095 | 1.125 | 1.101 | 1.110 |

FIG. 11(a)
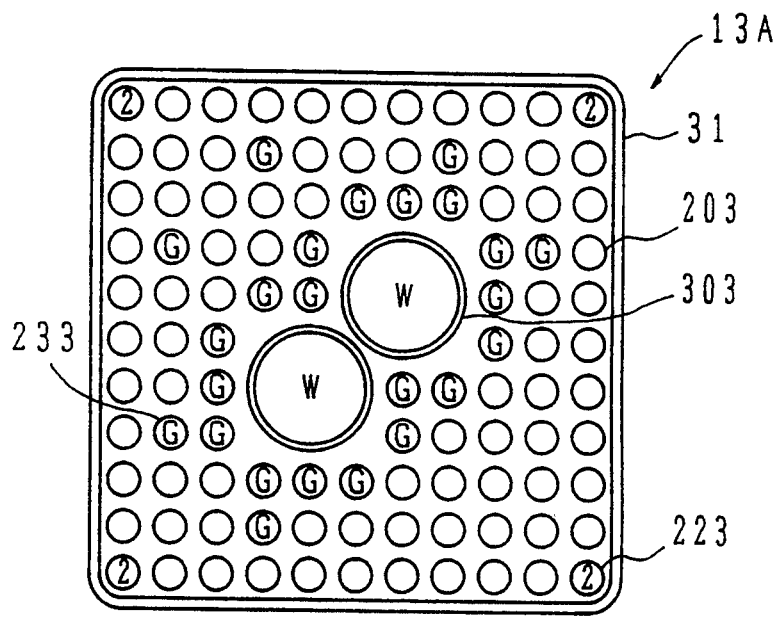
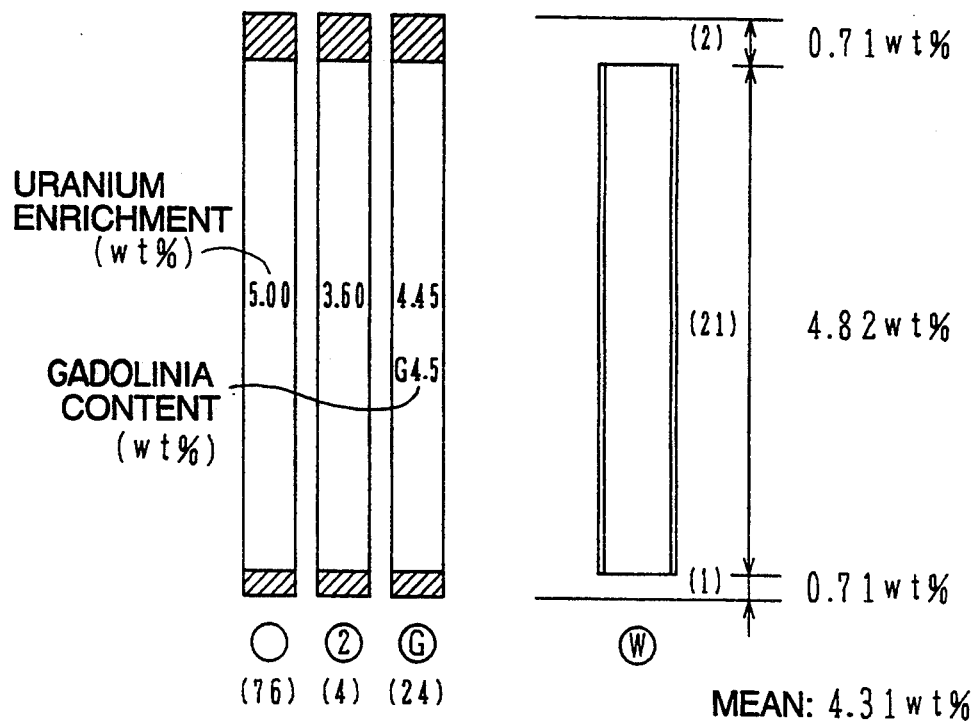
FIG. 11(b)    FIG. 11(c)

FIG. 18(a)
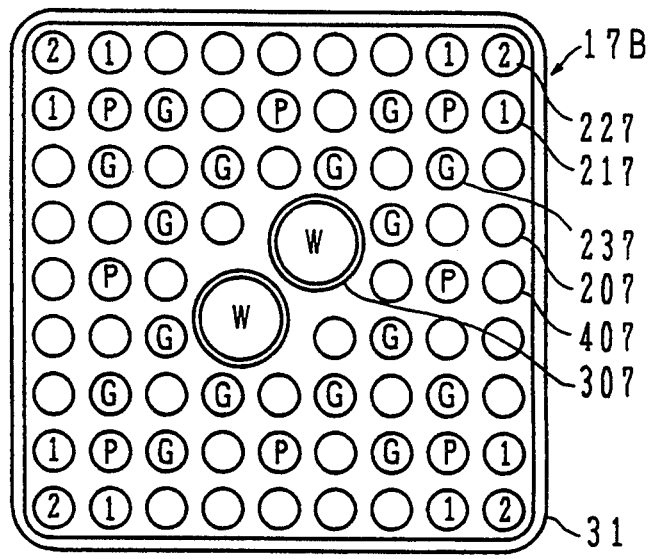
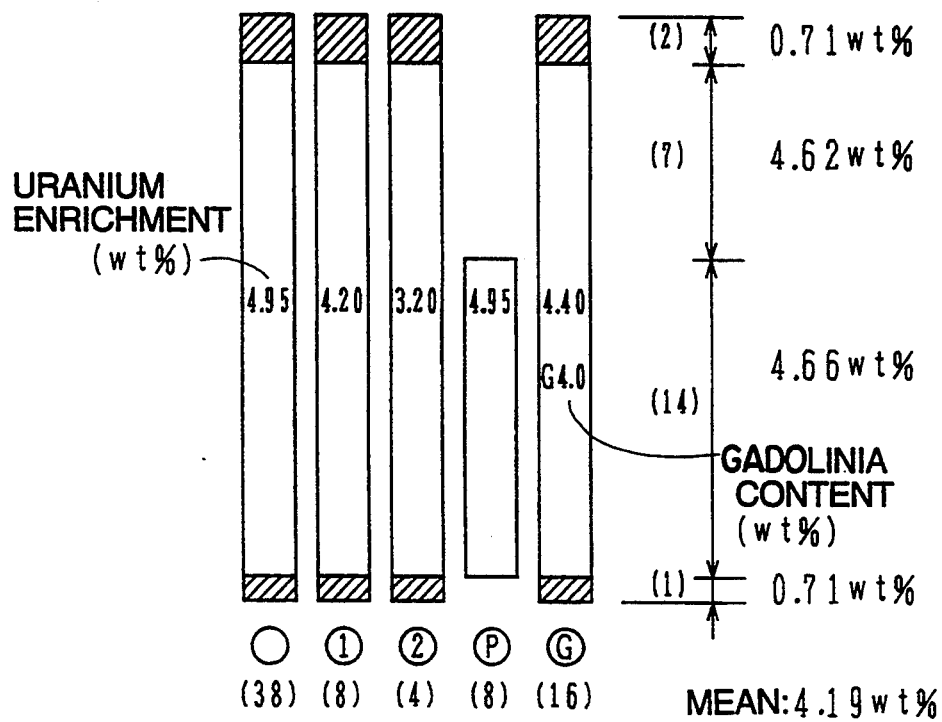
FIG. 18(b)

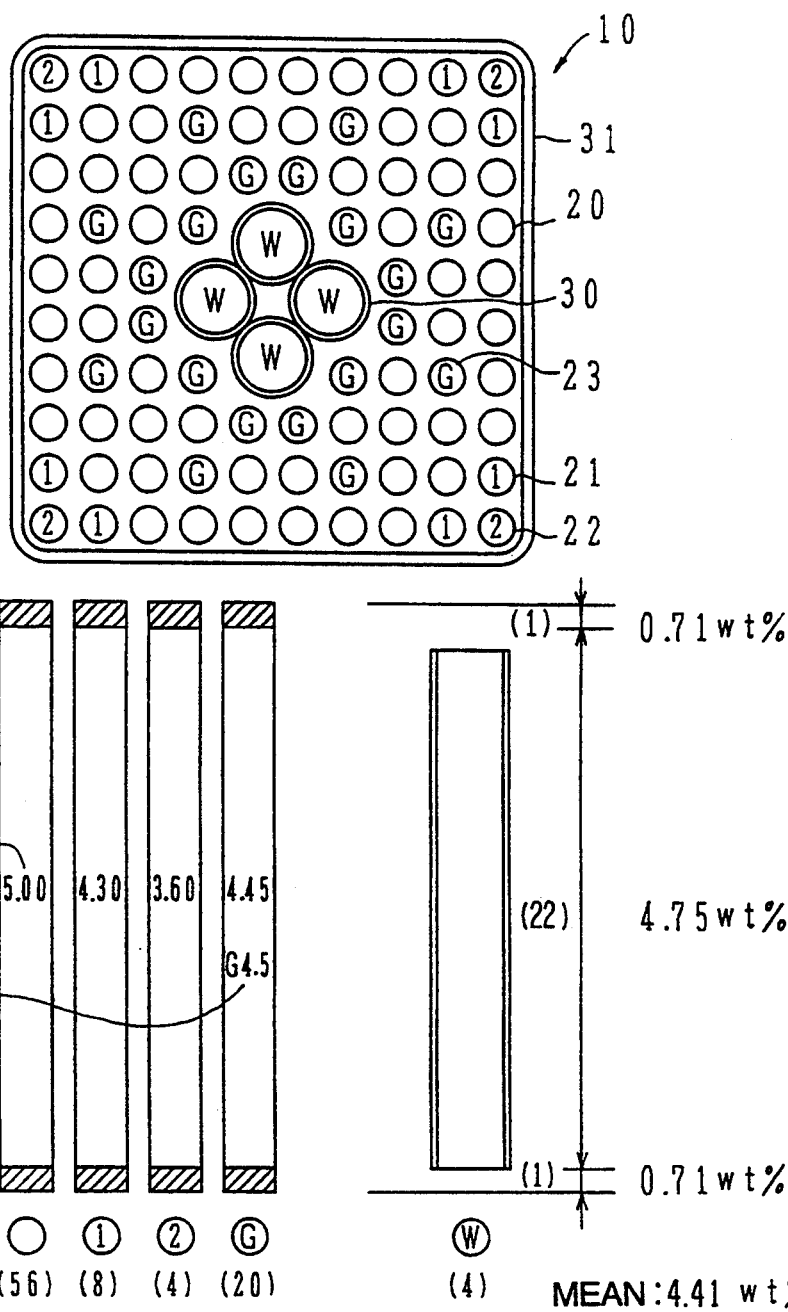

NUCLEAR FUEL ASSEMBLY AND CORE

BACKGROUND OF THE INVENTION

The present invention relates to a fuel assembly for a boiling water reactor (BWR), and more particularly to a fuel assembly suitable to achieve improved fuel economy with high burn-up when an applicable maximum uranium enrichment is limited, as well as a core employing such a fuel assembly.

Recently, an improvement in fuel economy and a reduction in the amount of radioactive waste (i.e., a reduction in the number of fuel rods removed from the core) have become important issues to be solved in the field of light-water nuclear reactors. For improving fuel economy and reducing the amount of radioactive waste, it is effective to increase discharged exposure (i.e., achieve high burn-up) of a fuel assembly.

For increasing discharged exposure of a fuel assembly, it is required to increase the content of uranium-235 in a uranium pellet for the fresh fuel assembly, namely, raise a mean uranium enrichment (i.e., achieve high enrichment) of the fresh fuel assembly. The following prior arts are known relating to how to raise the uranium enrichment for high burn-up.

(1) JP, A, 63-133086

This prior art is intended to lower a maximum (uranium) enrichment while achieving high enrichment. By arranging gadolinia containing fuel rods in the outermost periphery of a fuel assembly and in a part of cells around water rods, varieties of enrichment of fuel rods are reduced to two or three. Also, by increasing the number of those fuel rods which have a maximum enrichment, a value of the maximum enrichment is lowered. More specifically, in an embodiment of FIG. 1 in the publication of JP, A, 63-133086, the enrichment of the fuel rods is set to two values 7.2 wt% and 5.4 wt%, the uranium enrichment of the gadolinia containing fuel rods is set to the minimum value 5.4 wt%, and further the gadolinia containing fuel rods are arranged in the outermost periphery of the fuel assembly and around the water rods. In an embodiment of FIG. 10 in the publication of JP, A, 63-133086, the enrichment of the fuel rods is set to three values 6.6 wt%, 6.2 wt% and 5.2 wt%, the uranium enrichment of the gadolinia containing fuel rods is set to the maximum value 6.6 wt%, and further the gadolinia containing fuel rods are arranged in the outermost periphery of the fuel assembly and around the water rods.

(2) JP, A, 64-28587.

To raise a mean enrichment of a fuel assembly, in this prior art, the uranium enrichment of gadolinia containing fuel rods is set to a maximum value among uranium used in the fuel assembly, and the fuel effective length of the gadolinia containing fuel rods is shortened to suppress a rise of the internal pressure due to an increased output which results from maximizing the uranium enrichment of the gadolinia containing fuel rods.

SUMMARY OF THE INVENTION

Although the uranium enrichment of a fuel assembly must be raised for achieving high burn-up as mentioned above, raising the uranium enrichment requires considerations to be paid from various standpoints.

By way of example, if the uranium enrichment is raised with a view of high burn-up, power peaking in a fuel assembly, i.e., a local peaking factor, increases. In particular, the local peaking factor in an outermost layer of the fuel assembly, especially, in the regions near assembly corners, increases. As a result, neutrons are relatively likely to moderate in those regions. It is therefore required to control a distribution of the uranium enrichment of the fuel assembly so that the local peaking factor is kept smaller than a predetermined value, by for example lowering the enrichment of fuel rods in the outermost layer of the fuel assembly, especially, in the regions near assembly corners, where the output tends to increase to a higher level even with the same uranium enrichment.

Also, if the enrichment is raised without increasing a moderator-to-fuel ratio, the energy spectrum of neutrons would be hardened, an infinite multiplication factor of the fuel assembly would not become a maximum value of the infinite multiplication factor at the present enrichment, and further an absolute value of the void reactivity coefficient would be too large to provide a satisfactory response of the core in transient states. It is therefore required to increase the water region of water rods. With the water region of water rods increased, however, the number of fuel rods would be relatively reduced if the fuel assembly remains in an 8×8 lattice array, resulting in a small thermal margin. From that reason, it is contemplated to modify a fuel rod array into 9×9 lattices for enlarging a degree of freedom in arrangement of the water rods and reducing a mean linear heat generation rate of the fuel rods, thereby ensuring a satisfactory thermal margin.

Meanwhile, fuel rods added with burnable absorbers, e.g., gadolinia, (referred to as gadolinia containing fuel rods) are used for the purpose of holding down excess reactivity at the BOC (beginning of cycle). When the uranium enrichment is increased aiming at high burn-up, the extent and the period of time by and in which reactivity must be held down with gadolinia are both enlarged, leading to necessity of increasing the number of gadolinia containing fuel rods. If the gadolinia containing fuel rods are arranged in the outermost periphery of the fuel assembly, the effect of a control rod (i.e., the control rod worth) would be smaller because of the absorbers being additionally positioned near the control rod containing an absorber to control the reactivity. Therefore, the gadolinia containing fuel rods are usually arranged inwardly of the outermost periphery of the fuel assembly. Also, the gadolinia containing fuel rods have thermal conductivity several % smaller than those fuel rods containing uranium only. Accordingly, there is such a tendency of increasing the temperature at the fuel rod center even with the same output to possibly impair fuel soundness. With the above in mind, the uranium enrichment of the gadolinia containing fuel rods is set to be low.

In view of the foregoing technical background, the prior arts disclosed in the above-cited JP, A, 63-133086 and JP, A, 64-28587 have been proposed. These prior arts, however, have problems below.

With the present manufacture technique of fuel pellets, the maximum uranium enrichment available in a fuel assembly is limited to 5.0 wt%, taking into account the above practical situations. The prior art disclosed in the above-cited JP, A, 63-133086 adopts, as the maximum enrichment, 7.2 wt% (in the embodiment of FIG. 1) and 6.6 wt% (in the embodiment of FIG. 10), implying that this prior art is not intended to raise the mean enrichment under the above limitation. Also, in the embodiments of FIGS. 1 and 10, the number of gadolinia containing fuel rods is increased corresponding to the high enrichment of uranium on condition that a part of the gadolinia containing fuel rods is always arranged in the outermost periphery of the fuel assembly. Arranging the gadolinia containing fuel rods in the outermost periphery of the fuel assembly, however, lowers the control rod worth and impair the core shut-down performance. Accordingly, it is desired to raise the mean enrichment without arranging the gadolinia containing fuel rods in the outermost periphery of the fuel assembly, if practicable.

The prior art disclosed in JP, A, 64-28587 provides means for achieving high burn-up in the case that the maximum uranium enrichment is limited to 5.0 wt%. In this prior art, however, the uranium enrichment of the gadolinia containing fuel rods is set to the maximum enrichment at the cost of reducing the effective fuel rod length. This raises problems of making design less convenient because fuel rods existing under conventional specifications are no longer used, and of reducing the fuel inventory. Another problem is that since the rod center temperature of the gadolinia containing fuel rods with smaller thermal conductivity cannot be prevented from rising, it is impossible to clear the thermal limit value such as a linear heat generation rate.

An object of the present invention is to provide a fuel assembly and a core for boiling water reactors, in which a mean uranium enrichment can be raised to attain mean discharged exposure not less than 45 GWd/t without causing any problems in fuel rods added with burnable absorbers, when the maximum uranium enrichment is limited to 5.0 wt%.

To achieve the above-mentioned object, according to the present invention, there is provided a fuel assembly comprising a multiplicity of fuel rods filled with fuel pellets and arranged into a square lattice array, and at least one neutron moderator rod, the fuel pellets filled in said multiplicity of fuel rods having a maximum uranium enrichment not larger than 5 wt%, said multiplicity of fuel rods including a plurality of first fuel rods including no burnable absorbers and a plurality of second fuel rods including burnable absorbers, wherein (a) a mean uranium enrichment of said multiplicity of fuel rods per fuel assembly is not less than 4 wt%; (b) a percentage in number of said second fuel rods to said multiplicity of fuel rods is in the range of 20% to 30%, the uranium enrichment of the fuel pellets filled in said second fuel rods being between the maximum uranium enrichment of the fuel pellets filled in said multiplicity of fuel rods and a minimum uranium enrichment of the fuel pellets filled in said multiplicity of fuel rods; and (c) said first fuel rods include a plurality of third fuel rods in which fuel pellets filled in said third fuel rods have a uranium enrichment higher than a mean uranium enrichment in one cross-section of said fuel assembly, a percentage in number of said third fuel rods to said first fuel rods being not less than 75%.

In the above fuel assembly, preferably, said multiplicity of fuel rods respectively have regions of upper and lower end portions thereof in which the mean uranium-enrichment in one cross-section of said fuel assembly is lower than other region thereof. In this case, preferably, said regions of the upper and lower end portions include blankets of natural uranium. Also preferably, a ratio of the maximum uranium enrichment of said fuel pellets to the mean uranium enrichment in one cross-section of the fuel assembly in the other region is not larger than 1.16. Further preferably, the mean uranium enrichment in one cross-section of said fuel assembly is not less than 4.5 wt%. The mean uranium enrichment in one cross-section of said fuel assembly may be not less than 4.3 wt%.

In the above fuel assembly, preferably, said second fuel rods are arranged in regions of said square lattice array except the outermost periphery thereof.

Preferably, the uranium enrichment of the fuel pellets filled in all said third fuel rods is equal to the maximum uranium enrichment of said fuel pellets.

Preferably, a percentage in number of said third fuel rods to said first fuel rods is not less than 80%.

Preferably, said first fuel rods include a plurality of fourth fuel rods in which fuel pellets filled in said fourth fuel rods has a uranium enrichment lower than the mean uranium enrichment in one cross-section of said fuel assembly, said fourth fuel rods being arranged in corner regions of said square lattice array.

In the above fuel assembly, preferably, said neutron moderator rod or rods have a moderator cross-sectional area of 7 to 14 $cm^2$. Also preferably, said neutron moderator rod or rods are arranged in a region capable of accommodating said fuel rods in number 7 to 17. Said neutron moderator rod or rods may be a spectral shift rod of which axial water level changes depending on a core flow rate.

In the above fuel assembly, preferably, said multiplicity of fuel rods has a lattice array of $9 \times 9$ or more.

Operation of the present invention constructed as set forth above is as follows. First, in the present invention, by setting the mean uranium enrichment of the multiplicity of fuel rods (i.e., all the fuel rods) per fuel assembly (hereinafter also referred to as the mean uranium enrichment of the fuel assembly or assembly mean enrichment) to be not less than 4 wt%, mean discharged exposure of the fuel assembly becomes not less than 45 GWd/t.

Then, by setting the percentage of the second fuel rods containing burnable absorbers to all the fuel rods to be in the range of 20% to 30%, excess reactivity is properly controlled for an increase in the mean uranium enrichment of the fuel assembly. By setting the uranium enrichment of those fuel pellets filled in the second fuel rods (hereinafter also referred to as the pellet uranium enrichment) to be between the maximum uranium enrichment and the minimum uranium enrichment of the fuel pellets, the rod center temperature of the second fuel rods containing burnable absorbers, which are poor in thermal conductivity, becomes comparable to that of the other first fuel rods containing no burnable absorbers, which also contributes to increase the mean uranium enrichment not less than 4 wt%.

By setting the percentage in number of the third fuel rods, in which the pellet uranium enrichment is higher than the mean uranium enrichment in one cross-section of the fuel assembly (hereinafter also referred to as the cross-sectional mean uranium enrichment of the fuel assembly or cross-sectional mean enrichment), to be not less than 75%, the mean uranium enrichment of the fuel assembly can be made not less than 4 wt% under condition that burnable absorbers and low enrichment fuel such as the blankets of natural uranium, etc. are maximally employed.

By so setting, even when the maximum uranium enrichment is limited to 5.0 wt%, the mean uranium enrichment can be raised to attain the mean discharged exposure not less than 45 GWd/t for high burn-up without causing any problems in the fuel rods added with burnable absorbers.

By providing those regions of the upper and lower portion of the fuel rod where the cross-sectional mean uranium enrichment of the fuel assembly is lower than other region thereof, e.g., the blankets of natural uranium, leakage of neutrons can be reduced to efficiently burn fuel for achieving higher burn-up.

When the regions having the lower mean uranium enrichment is formed in the upper and lower portions of the fuel rod, the mean uranium enrichment of the fuel assembly can be made not less than 4 wt% by setting the ratio of the cross-sectional mean uranium enrichment of the fuel assembly in the aforesaid other region to the maximum uranium enrichment of the fuel pellets to be not larger than 1.16. More specifically, when the blankets of natural uranium are provided in the upper end portion of 2/24 nodes and the lower end portion of 1/24, the mean uranium enrichment of the fuel assembly can be made not less than 4 wt% by setting the ratio of the maximum uranium enrichment of the fuel pellets to the cross-sectional mean uranium enrichment of the fuel assembly in the aforesaid other region to be not larger than 1.11. In this case, the cross-sectional mean uranium enrichment of the fuel assembly in the afore-said other region requires to be not less than 4.5 wt%. As an alternative, when the blankets of natural uranium are respectively provided in the upper and lower end portion of 1/24 node, the mean uranium enrichment of the fuel assembly can be made not less than 4 wt% by setting the ratio of the maximum uranium enrichment of the fuel pellets to the cross-sectional mean uranium enrichment of the fuel assembly in the aforesaid other region to be not larger than 1.16. In this case, the cross-sectional mean uranium enrichment of the fuel assembly in the aforesaid other region requires to be not less than 4.3 wt%.

By arranging the second fuel rods containing burnable absorbers in regions of the square lattice array except the outermost periphery thereof, a reduction in the control rod worth is prevented.

By setting the pellet uranium enrichment of all the third fuel rods equal to the maximum uranium enrichment, the effect of increasing the mean uranium enrichment of the fuel assembly not less than 4 wt% is maximized.

By setting the percentage in number of the third fuel rods to the first fuel rods to be not less than 80%, the effect of increasing the mean uranium enrichment of the fuel assembly not less than 4 wt% is increased.

By arranging the plurality of fourth fuel rods having the pellet uranium enrichment lower than the cross-sectional mean uranium enrichment of the fuel assembly in the corner regions of the square lattice array, the local peaking factor in the corner regions where neutrons are relatively likely to moderate to increase the output is reduced.

By setting the moderator cross-sectional area of the neutron moderator rod or rods to be in the range of 7 to 14 cm$^2$, the moderator-to-fuel ratio is increased in the fuel assembly having the higher uranium enrichment. Therefore, the neutron infinite multiplication factor of the fuel assembly becomes near a maximum value at the present enrichment and fuel economy is improved.

By arranging the neutron moderator rod or rods in a region capable of accommodating the fuel rods in number 7 to 17, i.e., by arranging a water rod region such that the water rod region positions in at least two of four fuel lattice adjacent to each other, a large-diameter water rod being circular in cross-section having a 2×2 size can be arranged in number 3 or 4 in the fuel assembly having a fuel rod array of 10×10, and in number 2 in the fuel assembly having a fuel rod array of 9×9. In the fuel assembly having a fuel rod array of 11×11, a large-diameter water rod being circular in cross-section having a 3×3 size can be arranged in number 2. Therefore, those coolant passage regions having a small effect of cooling the fuel rods are reduced and the critical power is increased.

By forming the neutron moderator rod as a spectral shift rod of which axial water level changes depending on a core flow rate, the neutron moderating effect is adjusted depending on the core flow rate and this can be effectively used for reactivity control or output control.

By arranging the fuel rods in a lattice array of 9×9 or more, the number of fuel rod layers building up the fuel assembly is increased and the degree of freedom in distributing the fuel rods in the fuel assembly is enlarged. Therefore, it becomes easy to adopt the arrangement required for increasing the mean uranium enrichment of the fuel assembly-not less than 4 wt%, i.e., to set the percentage of the second fuel rods containing burnable absorbers to all the fuel rods to be in the range of 20% to 30% without arranging the second fuel rods in the outermost periphery of the fuel assembly, or to set the percentage in number of the third fuel rods, in which the pellet uranium enrichment is higher than the mean uranium enrichment in one cross-section of the fuel assembly to be not less than 75%.

BRIEF DESCRIPTION OF THE DRAWINGS

FIG. 1 is a horizontal sectional view of a fuel assembly according to a first embodiment of the present invention and constructions of fuel rods in the assembly.

FIG. 7(a) and 7(b) are tables representing a distribution of local peaking in the fuel assembly shown in FIG. 1, respectively.

FIG. 11 is a horizontal sectional view of a fuel assembly according to a third embodiment of the present invention and constructions of fuel rods in the assembly.

FIG. 18 is a horizontal sectional view of a fuel assembly according to a seventh embodiment of the present invention and constructions of fuel rods in the assembly.

FIG. 20 is a horizontal sectional view of a fuel assembly according to another embodiment of the present invention with a construction of fuel rods in the assembly correspond to FIG. 1.

DETAILED DESCRIPTION OF THE PREFERRED EMBODIMENTS

Figure 2:
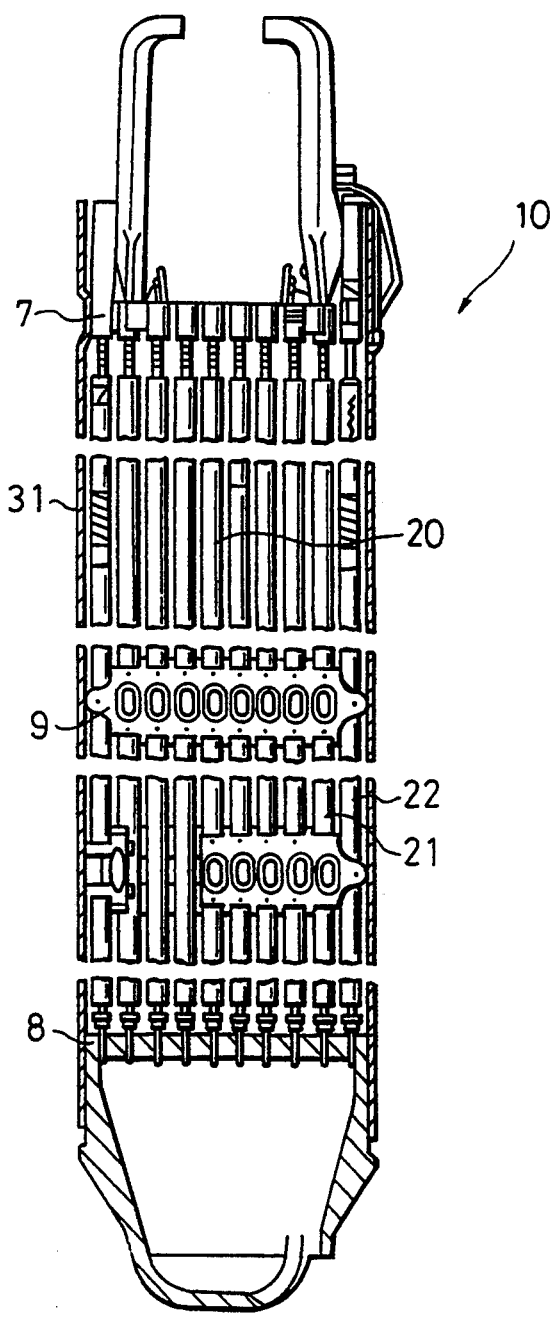
FIG. 2 is a vertical sectional view showing an entire construction of the fuel assembly shown in FIG. 1.

Hereinafter, preferred embodiments of the present invention will be described in detail with reference to the drawings.

To begin with, a description will be given of a first embodiment of the present invention by referring to FIGS. 1 to 9. This embodiment represents the case where a fuel assembly 10 has a fuel rod array of 10×10 and the maximum uranium enrichment of a fuel pellet is set to 5.0 wt%.

In FIG. 1, the fuel assembly of this embodiment comprises plural kinds of fuel rods 20, 21, 22, 23 and four large-diameter water rods 30, these fuel rods 20 to 23 and water rods 30 being arranged in a channel box 31. Of the above fuel rods, the fuel rods 21, 22 are ones arranged in four corner regions of the fuel assembly 10, the fuel rod 23 is one containing a burnable absorber, i.e., gadolinia (hereinafter referred to as a Gd rod), and further the fuel rod 20 is one other than the above fuel rods. Those fuel rods 20 to 23 are each constructed such that fuel pellets having an uniform uranium enrichment are filled in a region of 21/24 nodes of its fuel effective section except an upper end portion of 2/24 nodes and a lower portion of 1/24 node, and a blanket including natural uranium as fuel is formed in each of the upper end portion of 2/24 nodes and the lower portion of 1/24 node.

The fuel rods 20 exist in number 56 and the uranium enrichment of those fuel pellets filled therein (hereinafter referred to as the pellet uranium enrichment) is 5.0 wt%, i.e., the maximum uranium enrichment. The four fuel rods 22 positioned at the four corners each have the pellet uranium enrichment of 3.6 wt%, and the eight fuel rods 21 adjacent the fuel rods 22 respectively have the pellet uranium enrichment of 4.30 wt%. The Gd rods 23 are present in number 20 and their pellet uranium enrichment is 4.45 wt%. Of the Gd rods 23, 12 rods more than half of the total number are arranged adjacent the water rods 30. Further, the Gd rods 23 are arranged in regions of the square lattice array of the fuel rods other than the outermost periphery thereof. The enrichment of natural uranium in the blanket regions of the upper and lower end portions is 0.71 wt%.

The total number of the fuel rods 20, 21, 22, 23 is 88 and the percentage in number of the Gd rods to all the fuel rods is 20/88=23%. The pellet uranium enrichment 4.45 wt% of the Gd rods 23 is between the pellet maximum uranium enrichment of 5.0 wt% and the pellet minimum uranium enrichment of 3.6 wt%. The total number of the fuel rods except the Gd rods 23 is 68. Of these 68 fuel rods, the percentage in number of the fuel rods 20 having the pellet maximum uranium enrichment is 56/68=82 %. In this case, the mean uranium enrichment of all the fuel rods per fuel assembly (hereinafter also referred to as the mean uranium enrichment of the fuel assembly or assembly mean enrichment) is 4.25 wt%. Furthermore, the mean uranium enrichment in one cross-section of the fuel assembly 10 in the enriched fuel section except the blanket regions of the upper and lower end portions (hereinafter also referred to as the cross-sectional mean uranium enrichment of the fuel assembly or cross-sectional mean enrichment) is 4.75 wt%. The ratio $e_{max}/e_{mean}$ of the pellet maximum uranium enrichment to the cross-sectional mean enrichment is 5/4.75=1.05.

The water rods 30 are each of a water rod which has a 2×2 size and is circular in cross-section, with the total moderator cross-sectional area being of 10 cm$^2$. These water rods 30 are arranged in a region where total 12 fuel rods can be accommodated.

FIG. 2 shows an entire construction of the fuel assembly 10. The fuel rods 20, 21, 22, 23 and the water rods 30 are supported at their upper ends by an upper tie plate 7 and at their lower ends supported by a lower tie plate 8, and are also tightly held at seven intermediate axial locations by 1st- to 7th-stage spacers 9. A channel box 31 encloses a fuel bundle which is built up by those fuel rods and water rods.

Figure 3:
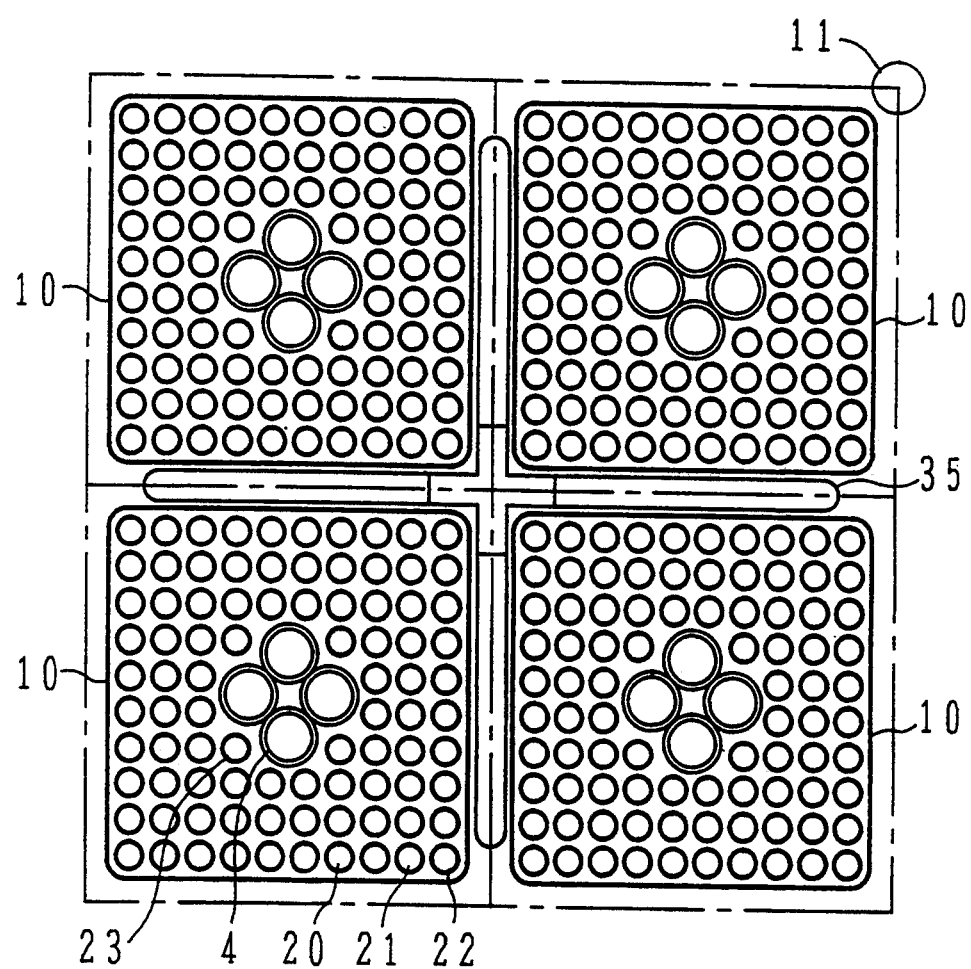
FIG. 3 is a view showing an arrangement of the fuel assembly shown in FIG. 1 in a core.

FIG. 3 shows an arrangement of the fuel assembly 10 in a core. The fuel assembly 10 of this embodiment is arranged in total four around a cross-shaped control rod 35 to thereby jointly build up one fuel cell. A neutron detecting counter 11 is disposed near one corner of the fuel cell. A core of a boiling water reactor is constituted by such a fuel cell in a large number.

Operation of the fuel assembly of this embodiment will be described below.

With the present manufacturing technique of fuel pellets, the maximum uranium enrichment of fuel pellets available in a fuel assembly is limited to 5.0 wt%. This embodiment is to, under such a limitation, raise the mean uranium enrichment and attain the mean discharged exposure not less than 45 GWd/t while holding the power peaking down to a small value, without causing any problems in those fuel rods which are added with burnable absorbers. Method to achieve the above will now be described.

Figure 4:
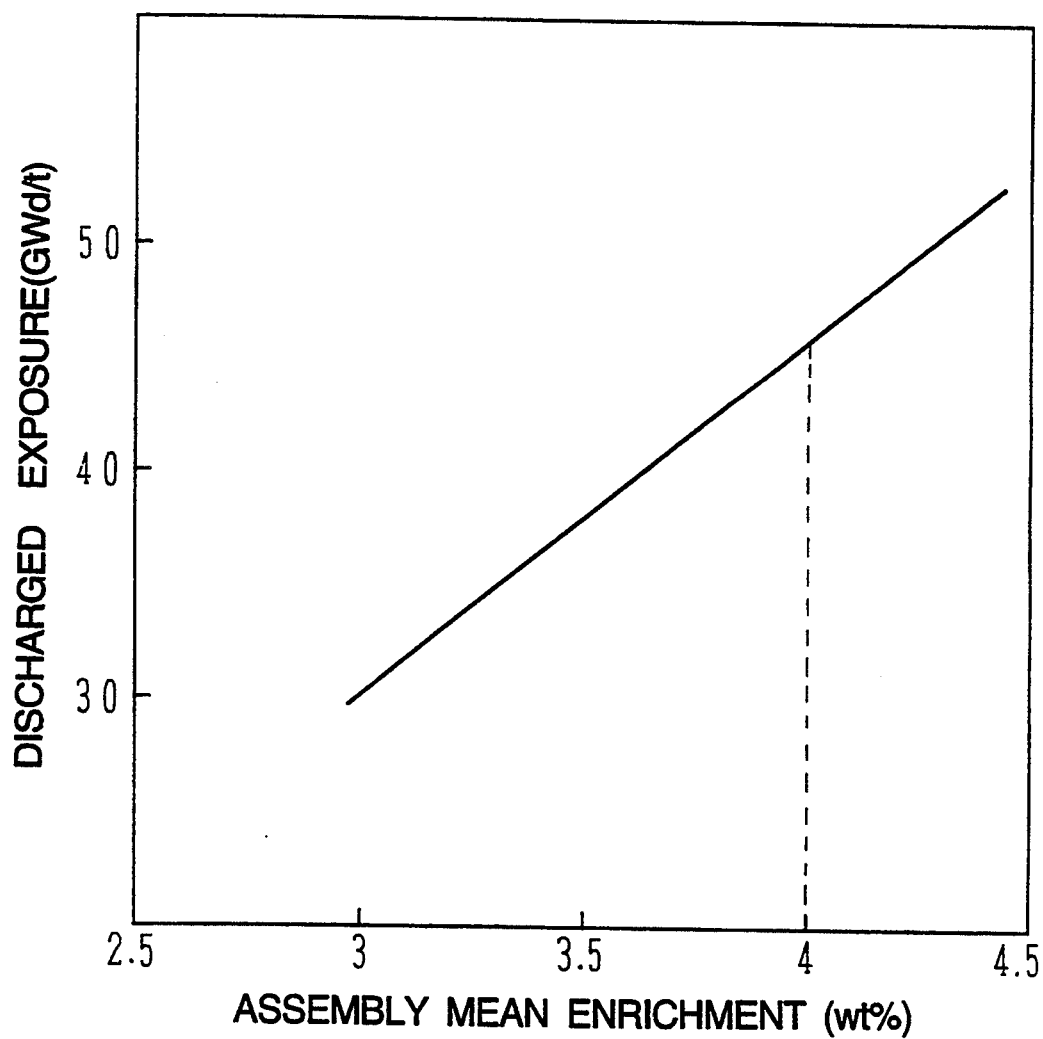
FIG. 4 is a graph showing the relationship between discharged exposure and a mean uranium enrichment of the fuel assembly.

For increasing the discharged exposure of the fuel assembly, it is required to raise the uranium enrichment of fuel pellets for a fresh fuel assembly to be loaded into the core. FIG. 4 shows the relationship between the discharged exposure and the mean uranium enrichment of the fuel assembly. The present invention is intended to attain the mean discharged exposure not less than 45 GWd/t. It will be seen from the graph of FIG. 4 that the mean uranium enrichment of the fuel assembly is required to be not less than 4.0 wt% for achieving the mean discharged exposure not less than 45 GWd/t. In the fuel assembly 10 of this embodiment, the mean uranium enrichment is 4.25 wt% as mentioned above and, therefore, the discharged exposure of about 50 GWd/t can be achieved.

Meanwhile, this embodiment includes the blankets of natural uranium in the upper and lower end portions of the fuel rod. By so providing the blankets of natural uranium, leakage of neutrons can be reduced to efficiently burn the fuel and realize higher burn-up.

On the other hand, when the blankets of natural uranium are provided in the upper and lower end portions of the fuel rod as mentioned above, what is important from the standpoint of design is the uranium enrichment in the enriched fuel section except the blankets in the upper and lower end portions. In this embodiment, natural uranium (enrichment: 0.71 wt %) in the upper and lower end portions occupies 2/24 nodes and a 1/24 node, respectively. In this case, if the cross-sectional mean uranium enrichment of the fuel assembly in the enriched fuel section is set to be not less than 4.5 wt%, the mean uranium enrichment of the fuel assembly becomes not less than 4.0 wt%. On that condition, the ratio $e_{max}/e_{mean}$ of the pellet maximum uranium enrichment to the cross-sectional mean enrichment is not larger than $5/4.5 = 1.11$.

Generally, the blankets of natural uranium in the upper and lower end portions may be respectively provided to occupy a 1/24 node in some cases as shown in FIG. 20. In these cases, if the cross-sectional mean uranium enrichment of the fuel assembly in the enriched fuel section is set to be not less than 4.3 wt%, the mean uranium enrichment of the fuel assembly becomes not less than 4.0 wt% and the ratio $e_{max}/e_{mean}$ of the pellet maximum uranium enrichment to the cross-sectional mean enrichment is not larger than $5/4.3 = 1.16$.

In this embodiment, the cross-sectional mean uranium enrichment of the fuel assembly in the enriched fuel section is 4.75 wt% and the ratio $e_{max}/e_{mean}$ of the pellet maximum uranium enrichment to the cross-sectional mean enrichment is 1.05, as mentioned above, these values being respectively not less than 4.5 wt% and not larger than 1.11 resulted when the blankets of natural uranium are provided in the upper and lower end portions to occupy 2/24 nodes and a 1/24 node, respectively.

Another point to be considered in the case of raising the mean uranium enrichment of the fuel assembly not less than 4.0 wt% is the number of the Gd rods 23 added with burnable absorbers, i.e., gadolinia. The Gd rods 23 are used to hold down excess reactivity at the BOC. However, when the uranium enrichment is raised aiming at high burn-up, the extent by which reactivity must be held down with gadolinia is enlarged. It is therefore required to increase the number of gadolinia containing fuel rods. That fact is generally known, but no considerations have not so far been paid to the quantitative relationship between an increase in the uranium enrichment and the suitable number of the Gd rods required to be increased correspondingly.

Figure 5:
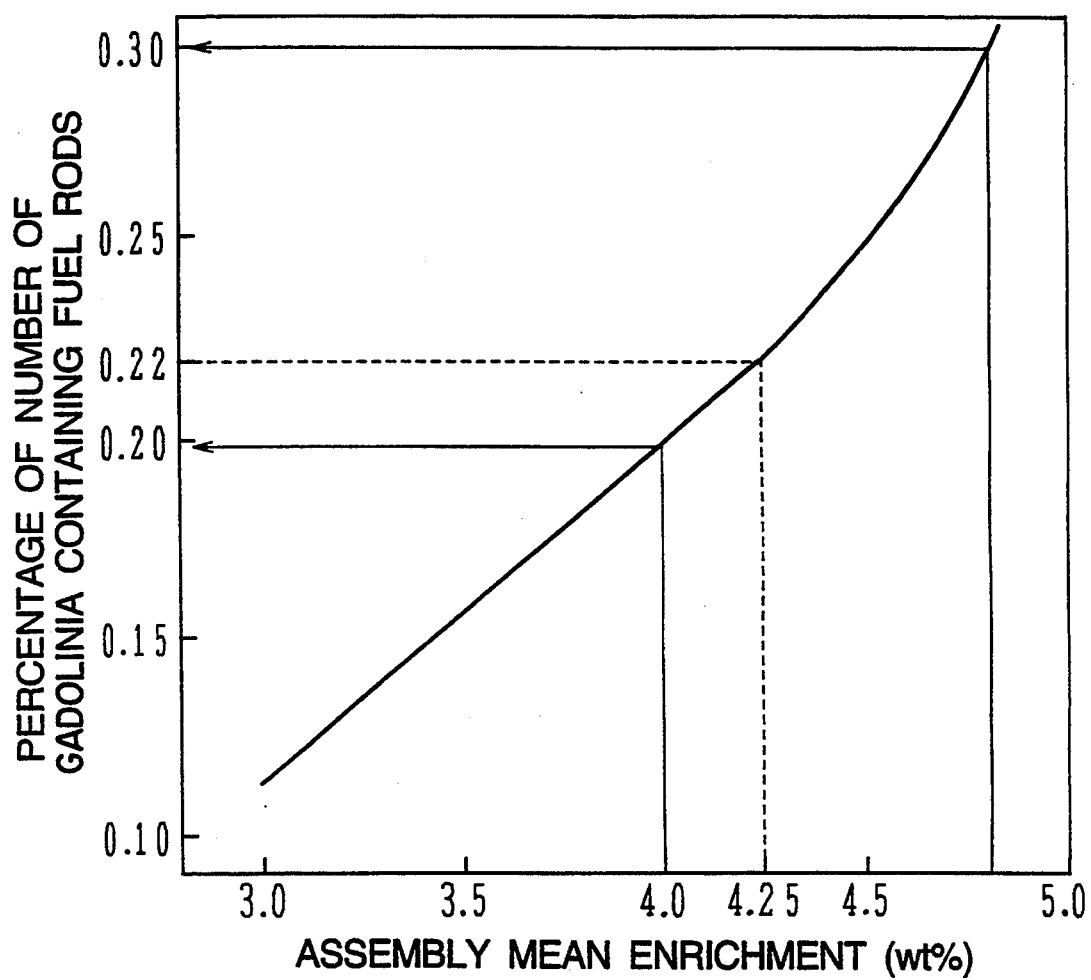
FIG. 5 is a graph showing the relationship between a mean uranium enrichment of the fuel assembly and a percentage of the number of gadolinia containing fuel rods.

As results of studying a relationship between an increase in the mean uranium enrichment of the fuel assembly and a proportion of the number of gadolinia containing fuel rods, the inventors of this application obtained the relationship shown in the graph of FIG. 5. Here, a proportion of the number of gadolinia containing fuel rods implies a percentage in number of gadolinia containing fuel rods, which are required to properly control excess reactivity, to the total fuel rods included in the fuel assembly. From the graph of FIG. 5, it will be seen that when the mean uranium enrichment of the fuel assembly is set to be not less than 4.0 wt%, the proportion of the number of gadolinia containing fuel rods required to properly control excess reactivity is not less than 20%.

The proportion of the number of gadolinia containing fuel rods depends on the mean uranium enrichment of the fuel assembly, as shown in FIG. 5. In the present invention that the maximum uranium enrichment of fuel pellets is limited to 5 wt%, the cross-sectional mean uranium enrichment of the fuel assembly is 5 wt% at maximum. As described later, however, because of arranging those fuel rods which are added with burnable absorbers and suppressing the local peaking of those fuel rods which are positioned in the corner regions, a maximum value of the cross-sectional mean uranium enrichment of the fuel assembly becomes 4.8 wt%.

Assuming that blankets of natural uranium are not provided, a maximum value of the mean uranium enrichment of the fuel assembly can be increased up to near 4.8 wt% as the maximum value of the cross-sectional mean enrichment. Accordingly, as shown in FIG. 5, the percentage in number of gadolinia containing fuel rods to the total fuel rods is required to be set in the range of 20% to 30% for properly controlling excess reactivity of the fuel assembly available in the present invention.

In the fuel assembly 10 of this embodiment, the mean uranium enrichment is 4.25 wt% and the percentage of the number of gadolinia containing fuel rods required to properly control excess reactivity is 22%. On the other hand, the percentage in number of the Gd rods to all the fuel rods is 23%, as mentioned above. Consequently, the excess reactivity can be properly controlled.

If the gadolinia containing fuel rods are arranged in the outermost periphery of the fuel assembly, the effect of the control rod (i.e., the control rod worth) would be smaller because of the absorbers being additionally positioned near the control rod containing an absorber to control the reactivity. In this embodiment, therefore, the Gd rods 23 are arranged in regions other than the outermost periphery of the square lattice array thereof in accordance with conventional common principle, for preventing a reduction in the control rod worth.

A description will now be given of the construction adopted in this embodiment to achieve the mean uranium enrichment of the fuel assembly at a value 4.25% not less than 4 wt%. The basic concept of the present invention will be first explained.

Figure 6:
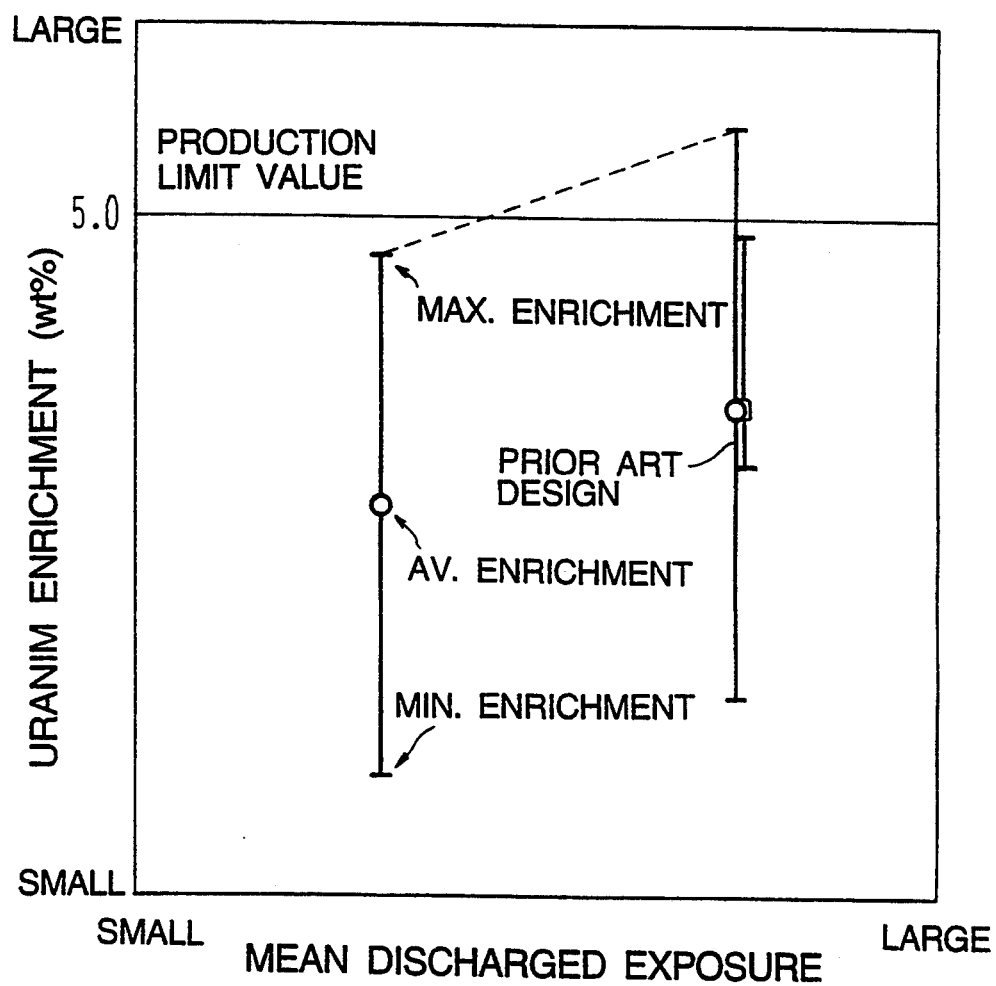
FIG. 6 is a graph showing the relationship between a uranium enrichment and mean discharged exposure.

FIG. 6 is a graph showing the relationship between the uranium enrichment and the mean discharged exposure. A white circle in the graph of FIG. 6 represents the mean uranium enrichment of the fuel assembly, and a vertical line extending from the white circle upward and downward represents a uranium enrichment distribution (i.e., a uranium enrichment split). In a fuel assembly for use with boiling water reactors, local power peaking is reduced by making a difference in the uranium enrichment of fuel rods. The local power peaking is produced in, particularly, the fuel rods arranged in regions where the effect of moderating neutrons is large, i.e., those ones which are arranged in the corner regions of the fuel assembly and those ones which are adjacent to water rods. Therefore, the uranium enrichment of those fuel rods is required to be lowered. Also, as stated before, the fuel rods added with gadolinia to hold down excess reactivity at the BOC have thermal conductivity several % smaller than those fuel rods containing uranium only. Accordingly, the temperature at the fuel rod center tends to increase to a higher level even with the same output, which is not desired from the standpoint of safety. It is therefore also required to lower the uranium enrichment of the gadolinia containing fuel rods. On the other hand, for achieving a target value of the mean discharged exposure, the uranium enrichment of the fuel rods other than the above-mentioned fuel rods must be raised to maintain the desired mean uranium enrichment. Thus, in order to reduce the local power peaking while maintaining the desired mean uranium enrichment, the fuel rods are required to be given a uranium enrichment distribution to some extent, as shown in FIG. 6.

Increasing the discharged exposure necessitates an increase in the uranium enrichment, and the simplest way to realize that is to increase the uranium enrichment of all the fuel rods to a required enrichment. In practice, however, the uranium enrichment of those fuel rods which are arranged in the outermost periphery of the fuel assembly, are adjacent to the water rods, and contain gadolinia must be lowered, as mentioned above. Accordingly, for increasing the uranium enrichment, a proportion of those fuel rods having the uranium enrichment higher than the mean value is required to be increased.

Here, fuel pellet production equipment has an upper limit of 5.0 wt% in the uranium enrichment achievable within its production capability. Therefore, when the mean uranium enrichment is increased, the pellet maximum uranium enrichment would exceed such a production limit value if the same enrichment split is kept after increasing the mean uranium enrichment. This behavior is also shown in the graph of FIG. 6. At the present, the production limit value of the pellet maximum uranium enrichment cannot be raised over 5.0 wt%. Accordingly, as a method of raising the mean uranium enrichment without making the pellet maximum uranium enrichment exceed the production limit value, it could be contemplated to shorten the enrichment split such that the pellet minimum uranium enrichment is increased so as to become a more uniform enrichment distribution, for thereby raising the mean uranium enrichment. This behavior is also shown in the graph of FIG. 6. However, increasing the pellet minimum uranium enrichment is not a suitable method, because the fuel rods have thermal limit values such as a linear heat generation rate and the local power peaking must be held down not larger than a predetermined value. In view of the above, the basic concept of the present invention is to raise the mean uranium enrichment while reducing the local power peaking.

The concept of the present invention concerning how to reduce the local power peaking will be first explained. In peripheral regions of the fuel assembly, neutrons are relatively likely to moderate in those regions and the output tends to increase to a higher level even with the same uranium enrichment. That effect is remarkable in the 12 fuel rods in the four corner regions of the fuel assembly (3 fuel rods per corner), especially, in the total 4 fuel rods at the corners. It has been found that, to satisfy the thermal limit values such as a linear heat generation rate and keep the power peaking comparable to that of the fuel rods arranged at other positions and containing uranium only with the above neutron moderating effect taken into account, it is required to set the mean uranium enrichment of the total 4 fuel rods 22 at the four corners of the fuel assembly at a value between 0.6 to 0.76 of the maximum uranium enrichment, or to set the mean uranium enrichment of the total 12 fuel rods 21, 22 near the four corners of the fuel assembly at a value between 0.70 to 0.86 of the maximum uranium enrichment.

In this embodiment, the pellet uranium enrichment of the 4 fuel rods 22 at the four corners of the fuel assembly is set to 3.60 wt% that corresponds to 0.72 of the pellet maximum uranium enrichment. Also, the pellet uranium enrichment of respective fuel rods 21 adjacent to each of the fuel rods 22 at the four corners of the fuel assembly is set to 4.30 wt%. Then, the mean uranium enrichment of the total 12 fuel rods 21, 22 near the four corners is 4.07 wt% that corresponds to 0.81 of the pellet maximum uranium enrichment.

Further, since the fuel rods added with burnable absorbers (such as gadolinia) have thermal conductivity several % smaller than those fuel rods containing uranium only, as stated before, it is effective to set the local power peaking of the fuel rods containing burnable absorbers to be several % smaller than that of other ordinary uranium fuel rods containing no burnable absorbers at the end of the first cycle where burnable absorbers are burnt away, in order to make the rod center temperature of the fuel rods containing burnable absorbers comparable to that of the other fuel rods from the standpoint of safety. It has been found that, to this end, the mean uranium enrichment of the fuel rods containing burnable absorbers should be between 0.84 and 0.96 of the pellet maximum uranium enrichment.

In this embodiment, the pellet uranium enrichment of the Gd fuel rods 23 is set to 4.45 wt% that corresponds to 0.89 of the pellet maximum uranium enrichment. As a result, the rod center temperature of the Gd rods 23 can be kept comparable to that of the fuel rods containing no gadolinia.

FIG. 7 shows a distribution of the local peaking factor of the fuel assembly 10 in the first embodiment. More specifically, FIG. 7(a) shows a local peaking distribution at the beginning of the first cycle, i.e., at exposure of 0.0 GWd/t. It will be seen from the table of FIG. 7(a) that the local peaking factor is maximized at the four corners. However, the local peaking factor is held down on the order of 1.5, and this value is in an allowable range from the standpoint of thermal limitations such as a linear heat generation rate. FIG. 7(b) shows a local peaking distribution at the end of the first cycle, i.e., at exposure of 13.2 GWd/t. It will be seen that the local peaking factor of the Gd rods 23 has a maximum value 1,006, that is smaller than a maximum value 1,125 of the local peaking factor of the other fuel rods.

The concept of the present invention concerning how to raise the mean uranium enrichment will be next explained. As mentioned above, the present invention intends to raise the mean uranium enrichment while reducing the local peaking factor and, as conditions for meeting this purpose, it is assumed to set the gadolinia containing fuel rods to a low enrichment in the range of 0.84 to 0.96 of the maximum uranium enrichment, set the fuel rods in the corner regions to a low enrichment in the range of 0.70 to 0.86 of the maximum uranium enrichment, and increase in the percentage of the number of gadolinia containing fuel rods up to 30%. Also, for efficiently burning fuel with less leakage of neutrons, it is assumed to be desirable to provide the blankets of natural uranium. On the other hand, when the blankets of natural uranium are provided to respectively occupy 2 nodes and 1 node in the upper and lower end portions, the cross-sectional mean uranium enrichment of the fuel assembly is required to be not less than 4.5 wt% for achieving the mean uranium enrichment not less than 4.0 wt%. Stated otherwise, it is required in the present invention to set the cross-sectional mean uranium enrichment of the fuel assembly not less than 4.5 wt% even under conditions that the low enrichment fuel such as the gadolinia containing fuel rods and the blankets of natural uranium are maximally used.

Figure 8:
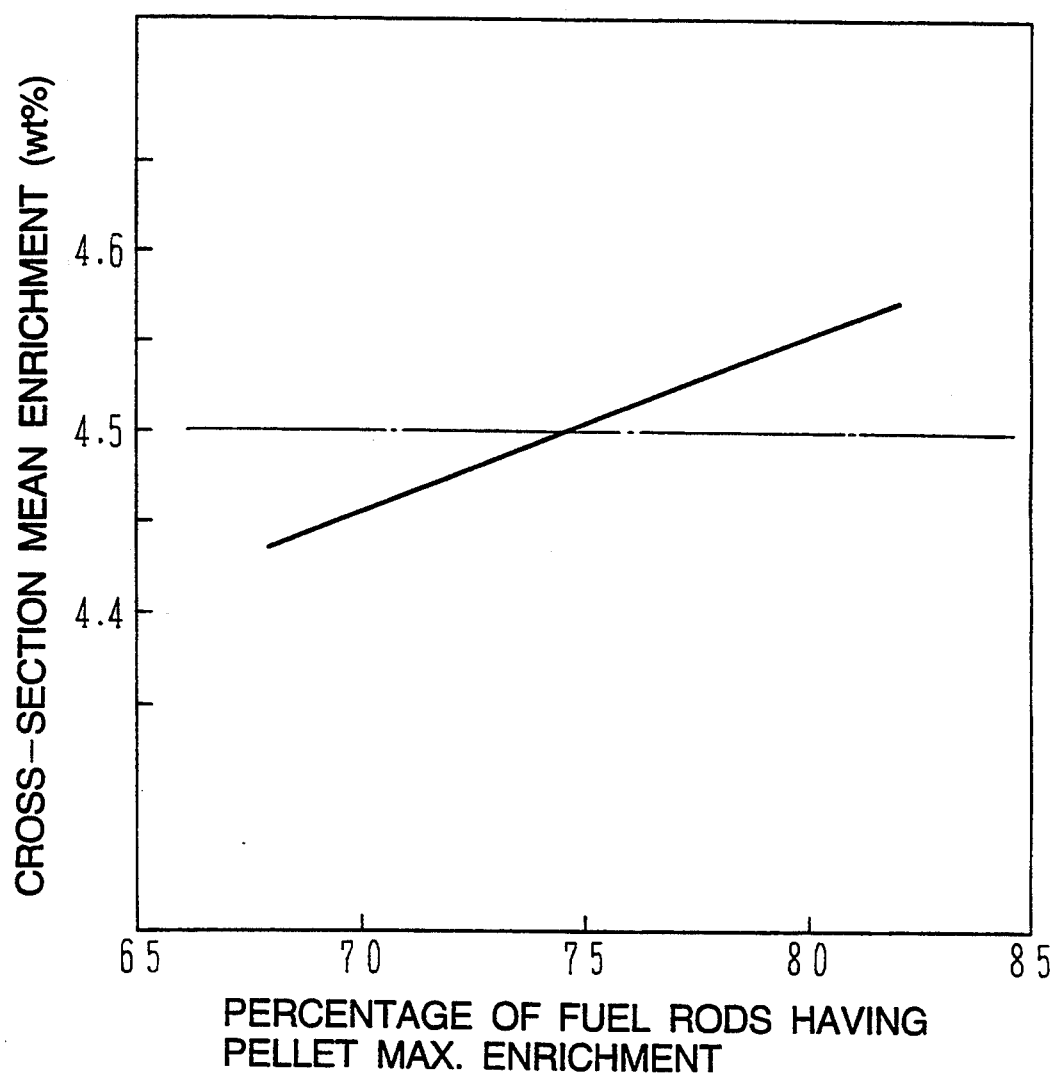
FIG. 8 is a graph showing the relationship between a percentage of those fuel rods having a pellet maximum uranium enrichment to fuel rods other than gadolinia containing fuel rods and a cross-sectional mean uranium enrichment of the fuel assembly.

FIG. 8 shows the relationship between a percentage of those fuel rods having the pellet maximum uranium enrichment to the fuel rods other than the gadolinia containing fuel rods and the cross-sectional mean uranium enrichment of the fuel assembly, which relationship is necessary to hold down the local power peaking not larger than conventional on condition that the uranium enrichment of the gadolinia containing fuel rods is set to 84% corresponding to a lower limit in the above range of 0.84 to 0.95, the uranium enrichment of the fuel rods in the corner regions is set to 70% corresponding to a lower limit in the above range of 0.70 to 0.86, and the remaining fuel rods have the pellet maximum uranium enrichment. It will be seen from the graph of FIG. 8 that the cross-sectional mean uranium enrichment of the fuel assembly becomes not less than 4.5 wt% by setting the percentage of those fuel rods having the pellet maximum uranium enrichment to be not less than about 75%. In other words, if the percentage in number of those fuel rods, which have the pellet uranium enrichment higher than the cross-sectional mean uranium enrichment of the fuel assembly, to the other fuel rods except the gadolinia containing fuel rods is set to be not less than 75%, the mean uranium enrichment of the fuel assembly can be not less than 4.0 wt%.

In this embodiment, the fuel rods 20 other than the total 12 peripheral fuel rods 21, 22 in the corner regions where the local power peaking tends to increase and the Gd rods 23, are all set to the maximum uranium enrichment of 5.0 wt% corresponding to a production upper limit enrichment, and the percentage in number of the fuel rods 20 to all the fuel rods 20, 21, 22 except the Gd rods 23 is 82%, as mentioned above. Accordingly, with this embodiment, it is possible to achieve the cross-sectional mean uranium enrichment of the fuel assembly at 4.75% not less than 4.5 wt% and the mean uranium enrichment of the fuel assembly at 4.25% not less than 4.0 wt%.

Still another point to be considered when raising the mean uranium enrichment not less than 4.0 wt% is a size (area) of the moderator region (i.e., the non-boiling water region). More specifically, if the enrichment is raised without increasing a moderator-to-fuel ratio, the energy spectrum of neutrons would be hardened, an infinite multiplication factor of the fuel assembly would not become a maximum value of the infinite multiplication factor at the present enrichment, and further an absolute value of the void reactivity coefficient would be too large to provide a satisfactory response of the core in a transient state. It is therefore required to increase the moderator region. However, if the fuel assembly remains in an 8×8 lattice array, the number of fuel rods would be relatively reduced, resulting in a small thermal margin. From that reason, in this embodiment, a lattice array of 10z 10 is adopted and the total cross-sectional area of the water rods 30 is set to 10 cm$^2$. A method to optimize the sectional area of the water rods and so on will be described below.

Figure 9:
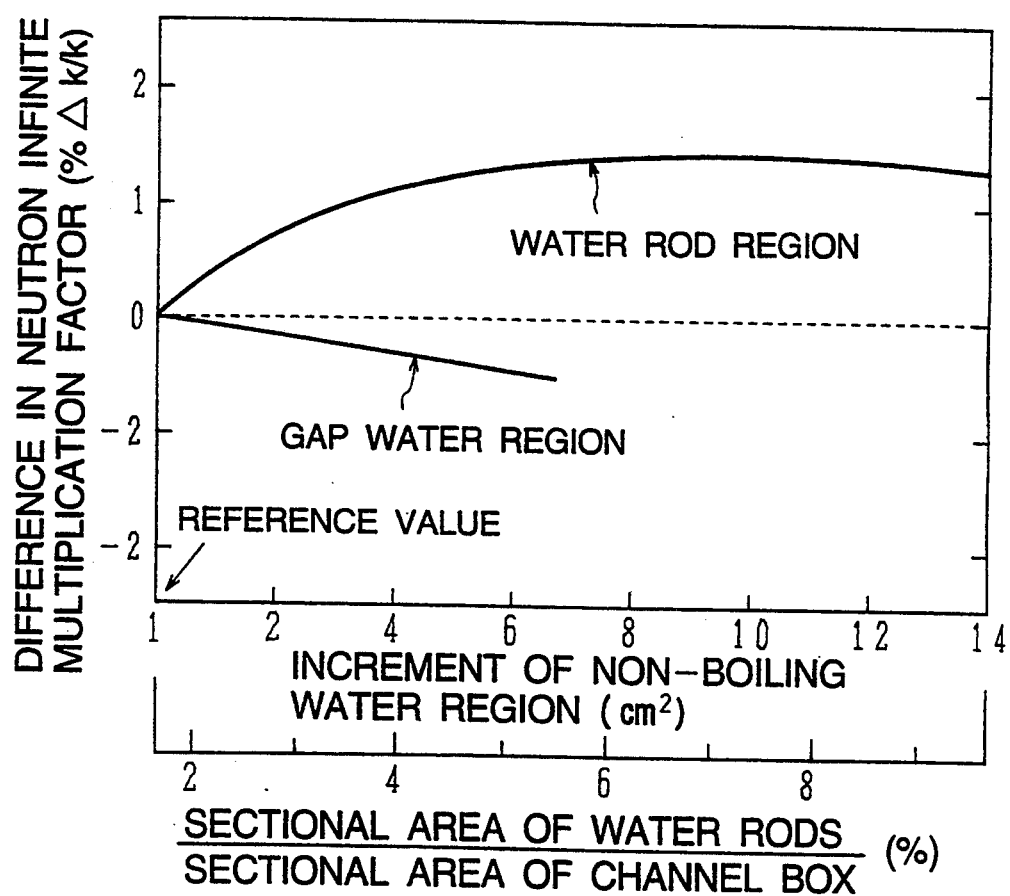
FIG. 9 is a graph showing the effect of improving reactivity with an increase in the moderator region.

FIG. 9 comparatively shows change in reactivity as resulted when the water rod region (i.e., a moderator in the inner region) is enlarged and when the gap water region (i.e., a moderator in the outer region) outside the channel box is enlarged, on condition that the fuel inventory is kept constant in a fuel assembly that the number of lattices in the fuel rod array is increased to 10×10. The horizontal axis represents two parameters; namely, an increment of the water rod region or the gap water region (i.e., an increment of the non-boiling water region), and a percentage of the cross-sectional area of the water rods to the cross-sectional area of the channel box depending on such an increment of the water rod region. The vertical axis represents a difference in the neutron infinite multiplication factor with a reference set to 3 cm$^2$ (1.7%) that is a cross-sectional area of water rods in the existing fuel assembly. It will be seen from the graph of FIG. 9 that, for the purpose of increasing the neutron infinite multiplication factor, enlarging the water rod region inside the fuel assembly is more effective (i.e., more highly sensitive) than enlarging the gap water region outside the fuel assembly facing the channel box. This is attributable to that thermal neutrons are less absorbed by the moderator as a result of flattening in distribution of thermal neutron flux there. The flattering in distribution of thermal neutron flux is also important in a point of ensuring a thermal margin because it affects not only fuel economy but also a local power distribution.

Thus, in the fuel assembly of 10×10 lattice array, enlarging the cross-sectional area of the water rods is effective for an improvement in fuel economy. Therefore, the cross-sectional area of the water rods requires to be enlarged from the current value of 3 cm$^2$ (1.7%).

On the other hand, enlarging the number of fuel lattices occupied by the water rod region reduces the number of fuel rods capable of being loaded, and hence is contradictory to high burn-up. Taking into account symmetry of the fuel assembly, a proper range of the number of fuel lattices occupied by the water rod region is from 2, the current number, to 8–16 (4–8 times) in the fuel assembly of 10×10 lattice array. In consideration of that an area of a unit fuel lattice in the fuel assembly of 10×10 lattice array is about 60% of that in the existing fuel assembly of 8×8 lattice array and, as mentioned above, the number of fuel lattices occupied by the water rod region is 4 to 8 times as many as the current number, the cross-sectional area of the water rods is appropriately in the range of 7 (4%) to 14 (8%) cm$^2$.

In this embodiment, the total cross-sectional area of the water rods 30 is about 10 cm$^2$ in the range of 7 to 14 cm$^2$, as stated above which can contribute to higher reactivity and improved fuel economy.

Further, when enlarging the cross-sectional area of the water rods, adoption of a large-diameter water rod is advantageous in that the number of fuel rods to be sacrificed can be reduced, and that the coolant passage area with a small effect of cooling fuel rods can be reduced (i.e., the critical power is increased). Assuming that the spacing between the water rods and the fuel rods adjacent to the water rods is constant, it is most advantageous, when the water rods are circular in cross-section, to make each water rod sized corresponding to 2×2 fuel lattices from the standpoint of effective utilization of a space.

In this embodiment, therefore, the region at the center of the fuel assembly where the neutron moderating effect is small and 12 fuel rods can be accommodated is used as a water rod region, and the large-diameter water rod 30 having a 2×2 size and being circular in cross-section is arranged in total four, whereby the coolant passage area with a small effect of cooling fuel rods is reduced. This construction contributes to an increase in the critical power.

A description will now be given of an array of fuel rods for raising the mean uranium enrichment of the fuel assembly not less than 4.0 wt%.

As mentioned above, with the intention of the present invention of raising the mean uranium enrichment while reducing the local power peaking, the percentage in number of those fuel rods, which have the pellet uranium enrichment higher than the cross-sectional mean uranium enrichment of the fuel assembly, to the other fuel rods except the gadolinia containing fuel rods is required to be not less than 75%. To this end, it is important to increase the number of those fuel rods having the pellet uranium enrichment higher than the cross-sectional mean uranium enrichment of the fuel assembly as far as possible. From that standpoint, in this embodiment, the uranium enrichment of all the fuel rods 20 except;
(1) the fuel rods in the outer periphery of the fuel assembly, particularly the 4 to 12 fuel rods in the four corner regions (3 fuel rods per corner);
(2) the fuel rods around the water rods; and
(3) the fuel rods containing burnable absorbers; is set to the pellet maximum uranium enrichment of 5.0 wt% in each rod section except the blankets of natural uranium, and the pellet uranium enrichment of the fuel rods other than the fuel rods 20 is set to a smaller value.

Further, in this embodiment, setting of the pellet uranium enrichment for the above (2) and (3) is realized by arranging the fuel rods containing burnable absorbers around the water rods. More specifically, since the neutron moderating effect is also large around the water rods and the local power peaking of the fuel rods adjacent to the water rods is tend to increase, it is desired to lower the uranium enrichment in those fuel rods. On the other hand, as stated before, the uranium enrichment of the fuel rods containing burnable absorbers must be lowered from the standpoint of thermal conductivity. In this embodiment, by arranging the fuel rods containing burnable absorbers around the water rods, there can be obtained advantages of holding down the local power peaking in positions where the power tends to relatively increase, and raising the mean uranium enrichment of the fuel assembly.

Thus, for raising the mean uranium enrichment of the fuel assembly and achieving high burn-up in the case that the maximum uranium enrichment is limited, it is effective to set the uranium enrichment of all the fuel rods, except (1) the 4 to 12 fuel rods in the four corner regions, (2) the fuel rods around the water rods, and (3) the fuel rods containing burnable absorbers, to the maximum value in the fuel assembly, set the uranium enrichment of the fuel rods other than those fuel rods to a smaller value, and arrange the fuel rods containing burnable absorbers as the fuel rods around the water rods.

Additionally, since the number of the fuel rods containing burnable absorbers in the fuel assembly is increased with high burn-up, the above-mentioned effect such as raising the mean uranium enrichment becomes greater by arranging the fuel rods containing burnable absorbers around the water rods as many as practicable. In the fuel assembly with an array of 10×10 or more, if the fuel rods containing burnable absorbers are arranged around the water rods as many as practicable, the number of those fuel rods around the water rods is ½ or more of the fuel rods containing burnable absorbers.

From the above reason, in this embodiment, ½ or more of the Gd rods 23 are arranged around the water rods 30, and the uranium enrichment of all the fuel rods 20, except the 12 fuel rods 21, 22 in the four corner regions of the fuel assembly 10 and the Gd rods 23 is set to the pellet maximum uranium enrichment of 5.0 wt%. By so arranging, when the maximum uranium enrichment is limited to 5.0 wt%, the mean uranium enrichment of the fuel assembly can be raised to achieve high burn-up.

With this embodiment, therefore, when the maximum uranium enrichment is limited to 5.0 wt%, it is possible to raise the mean uranium enrichment of the fuel assembly and attain the mean discharged exposure not less than 45 GWd/t for achievement of high burn-up while meeting thermal limit values such as a linear heat generation rate, without causing any problems in the gadolinia containing fuel rods. Also, such high burn-up enables an improvement in fuel economy and a reduction in number of spent fuels.

A second embodiment of the present invention will now be described with reference to FIG. 10. While the present invention is applied in the above first embodiment to the fuel assembly of 10×10 fuel rod array, this embodiment is practiced for a fuel assembly 13 of 11×11 fuel rod array on condition that the pellet maximum uranium enrichment is set to 5.0 wt%.

Figure 10A:
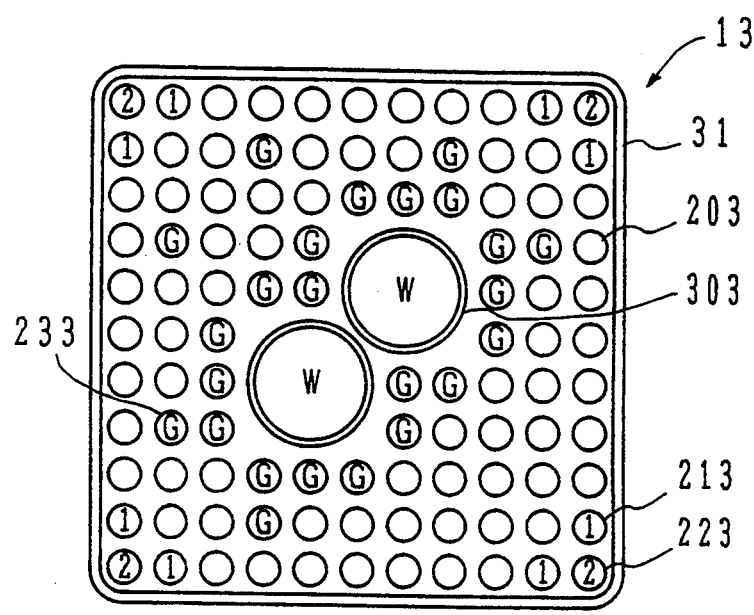
FIG. 10 is a horizontal sectional view of a fuel assembly according to a second embodiment of the present invention and constructions of fuel rods in the assembly.
Figures 10B, 10C:
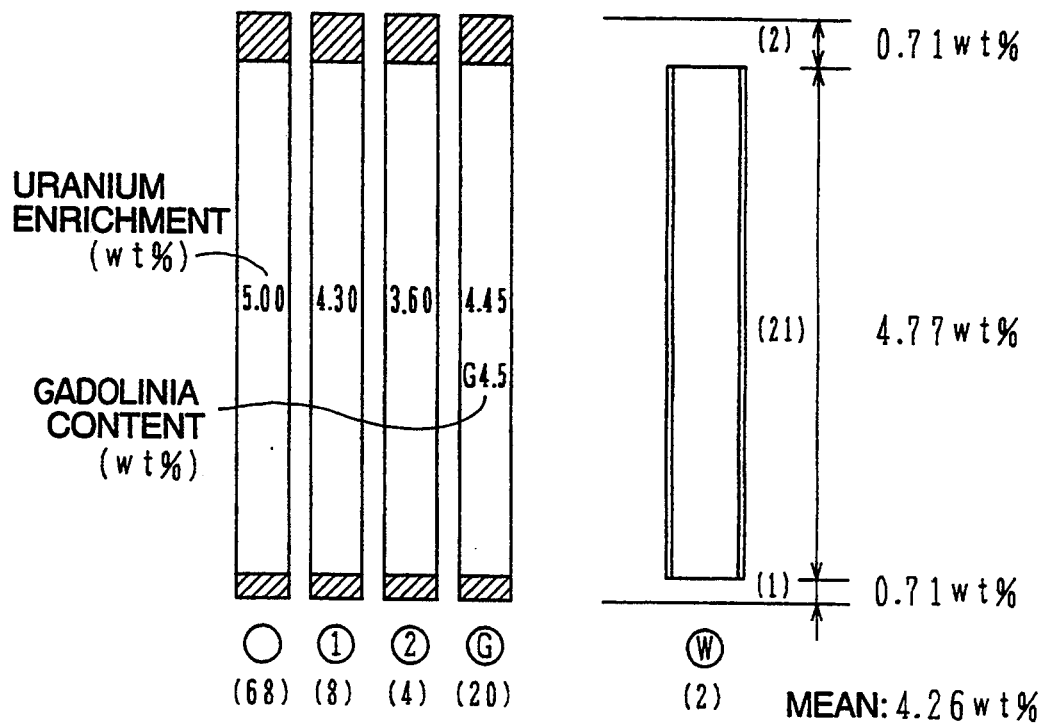

In FIG. 10, the fuel assembly 13 of this embodiment comprises plural kinds of fuel rods 203, 213, 223, 233 and two large-diameter water rods 303, these fuel rods 203 to 233 and water rods 303 being arranged in a channel box 31. Of the above fuel rods, the fuel rods 213, 223 are ones arranged in four corner regions of the fuel assembly 13, the fuel rod 233 is one containing a burnable absorber, i.e., a Gd rod containing gadolinia, and further the fuel rod 203 is one other than the above fuel rods. Those fuel rods 203 to 233 are each constructed such that fuel pellets having an uniform uranium enrichment are filled in a region of 21/24 nodes of its fuel effective section except an upper end portion of 2/24 nodes and a lower portion of 1/24 node, and a blanket including natural uranium as fuel is formed in each of the upper end portion of 2/24 nodes and the lower portion of 1/24 node.

The fuel rods 203 are present in number 68 and their pellet uranium enrichment is 5.0 wt%, i.e., the maximum uranium enrichment. The four fuel rods 223 positioned at the four corners each have the pellet uranium enrichment of 3.6 wt%, and the eight fuel rods 212 adjacent the fuel rods 223 each have the pellet uranium enrichment of 4.3 wt%. The Gd rods 233 are present in number 24 and their pellet uranium enrichment is 4.45 wt%. Of the Gd rods 233, 18 rods more than half of the total number are arranged adjacent to the water rods 303. Further, the Gd rods 233 are arranged in regions of the square lattice array of the fuel rods other than the outermost periphery thereof. The enrichment of natural uranium in the blanket regions at the upper and lower end portions is 0.71 wt%.

The total number of the fuel rods 203, 213, 223, 233 is 104 and the percentage in number of the Gd rods to all the fuel rods is 24/104=23%. The pellet uranium enrichment 4.45 wt% of the Gd rods 233 is between the pellet maximum uranium enrichment of 5.0 wt% and the pellet minimum uranium enrichment of 3.6 wt%. The total number of the fuel rods except the Gd rods 299 is 80. Of these 80 fuel rods, the percentage in number of the fuel rods 203 having the pellet maximum uranium enrichment is 68/80=85%. In this case, the mean uranium enrichment of the fuel assembly 13 can be raised to 4.26 wt%, enabling higher burn-up. Furthermore, the mean cross-sectional uranium enrichment of the fuel assembly 13 in the enriched fuel section except the blanket regions at the upper and lower end portions is 4.77 wt%. The ratio $e_{max}/e_{mean}$ of the pellet maximum uranium enrichment to the cross-sectional mean enrichment is 5/4.77=1.05.

The water rods 303 are respectively of a water rod which has a 3×3 size and is circular in cross-section, with the total moderator cross-sectional area being of 10 cm². These water rods 303 are arranged in a region where total 17 fuel rods can be accommodated.

With this second embodiment, there can also be obtained similar advantages to those in the first embodiment.

A third embodiment of the present invention will now be described with reference to FIG. 11. This embodiment is a modification of the above second embodiment. More specifically, a fuel assembly 13A of this embodiment is obtained by replacing each of the fuel rods 213 adjacent to the fuel rods 223 at the four corners with the fuel rods 203 having the pellet maximum uranium enrichment of 5.0 wt%. In the fuel rod array of 11×11, since the thermal burden imposed on each fuel rod is reduced, the uranium enrichment of the fuel rods adjacent the fuel rods 223 at the four corners may not always lowered, so that the number of the fuel rods 203 other than the four fuel rods 223 at the four corners and the Gd rods 233 can be increased to 76. Thus, the percentage in number of the fuel rods 203 having the pellet maximum uranium enrichment is 76/80=95%. In this case, the mean uranium enrichment of the fuel assembly 13A can be raised to 4.31 wt%, enabling still higher burn-up. Furthermore, the mean cross-sectional uranium enrichment of the fuel assembly 13A in the enriched fuel section except the blanket regions at the upper and lower end portions is 4.82 wt%. The ratio $e_{max}/e_{mean}$ of the pellet maximum uranium enrichment to the cross-sectional mean enrichment is 5/4.82=1.04.

A fourth embodiment of the present invention will now be described with reference to FIG. 12. This embodiment is practiced for a fuel assembly 15 of 10×10 fuel rod array on condition that the pellet maximum uranium enrichment is set to 4.95 wt%.

Figure 12A:
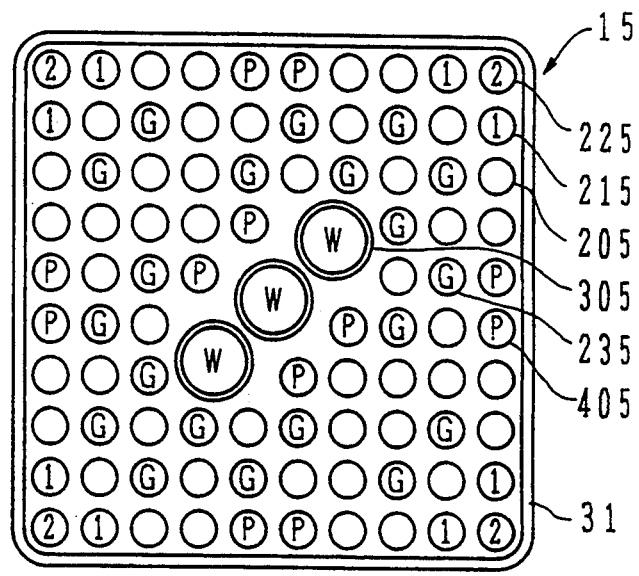
FIG. 12 is a horizontal sectional view of a fuel assembly according to a fourth embodiment of the present invention and constructions of fuel rods in the assembly.
Figure 12B:
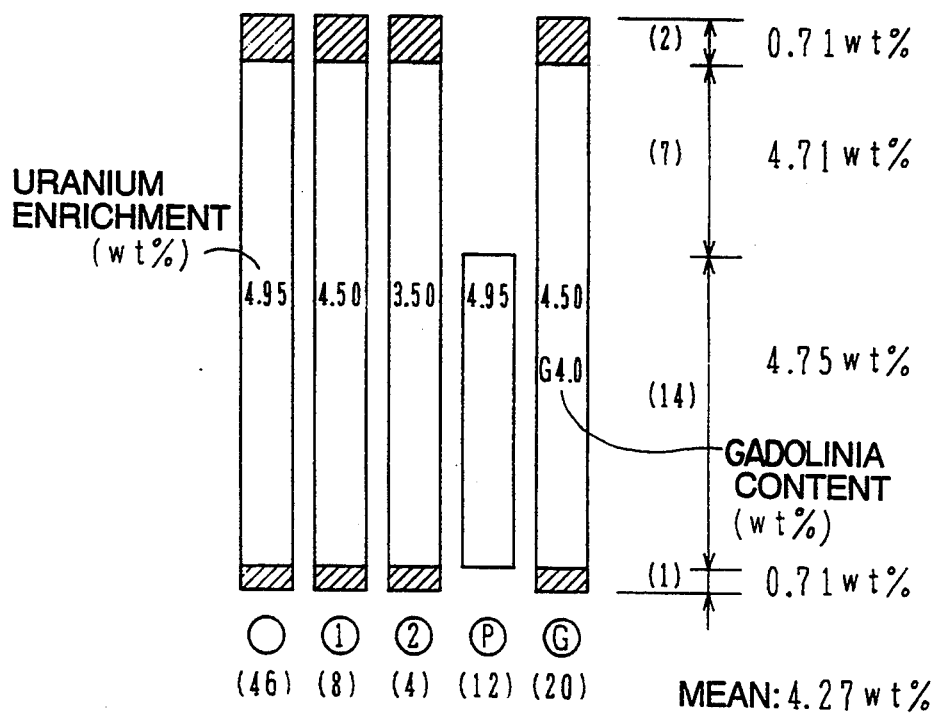

In FIG. 12, the fuel assembly 15 of this embodiment comprises plural kinds of fuel rods 203, 213, 225, 235, 405 and three large-diameter water rods 305, these fuel rods 203 to 235, 405 and water rods 305 being arranged in a channel box 31. Of the above fuel rods, the fuel rods 215, 225 are ones arranged in four corner regions of the fuel assembly 15, the fuel rod 235 is one containing a burnable absorber, i.e., a Gd rod containing gadolinia, and further the fuel rods 205, 405 are ones other than the above fuel rods. Those fuel rods 205 to 235 are each constructed such that fuel pellets having a uniform uranium enrichment are filled in a region of 21/24 nodes of its fuel effective section except an upper end portion of 2/24 nodes and a lower portion of 1/24 node, and a blanket including natural uranium as fuel is formed in each of the upper end portion of 2/24 nodes and the lower portion of 1/24 node. On the other hand, the fuel rod 405 is of a partial length fuel rod, shorter than the fuel rods 205 to 235, and its fuel rod effective length section, i.e., a section where the fuel pellets are filled, in this embodiment is located corresponding to 14/24 nodes in the axial direction of the other fuel rods. The partial length fuel rod 405 is provided with no blankets.

The fuel rods 205 are present in number 46 and their pellet uranium enrichment is 4.95 wt%, i.e., the maximum uranium enrichment. The four fuel rods 225 positioned at the four corners each have the pellet uranium enrichment of 3.5 wt%, and the eight fuel rods 235 adjacent the fuel rods 225 each have the pellet uranium enrichment of 4.5 wt%. The Gd rods 235 are present in number 20 and their pellet uranium enrichment is 4.5 wt%. The Gd rods 235 are arranged in regions of the square lattice array of the fuel rods other than the outermost periphery thereof. The enrichment of natural uranium in the blanket regions at the upper and lower end portions is 0.71 wt%. The partial length fuel rods 405 are present in number 12 and their pellet uranium enrichment is 4.95 wt%, i.e., the maximum uranium enrichment, as with the fuel rods 205.

The total number of the fuel rods 205, 215, 225, 235, 405 is 90 and the percentage in number of the Gd rods 235 to all the fuel rods is 20/90=22%. The pellet uranium enrichment 4.5 wt% of the Gd rods 235 is between the pellet maximum uranium enrichment of 4.95 wt% and the pellet minimum uranium enrichment of 3.5 wt%. The total number of the fuel rods except the Gd rods 235 is 70. Of these 70 fuel rods, the percentage in number of the fuel rods 205, 405 having the pellet maximum uranium enrichment is 58/70=83%. In this case, the mean uranium enrichment of the fuel assembly 15 can be raised to 4.29 wt%. Furthermore, the mean cross-sectional uranium enrichment of the fuel assembly 15 in the enriched fuel section except the blanket regions at the upper and lower end portions is 4.75 wt%. The ratio $e_{max}/e_{mean}$ of the pellet maximum uranium enrichment to the cross-sectional mean enrichment is 4.95/4.75=1.04.

The number of the fuel rods except the Gd rods 235 as viewed in cross-sections above the fuel effective length section of each partial length fuel rod 405 is 58. Of these 58 fuel rods, the percentage in number of the fuel rods 205 having the pellet maximum uranium enrichment is 46/58=79%. In this case, the mean cross-sectional uranium enrichment of the fuel assembly 15 in the enriched fuel section except the blanket regions at the upper and lower end portions is 4.71 wt%. The ratio $e_{max}/e_{mean}$ of the pellet maximum uranium enrichment to the cross-sectional mean enrichment is 4.95/4.71=1.05.

The water rods 305 are each of a water rod which has a 2×2 size and is circular in cross-section, with the total moderator cross-sectional area being of 10 cm². These water rods 305 are arranged in a region where total 10 fuel rods can be accommodated.

With this fourth embodiment, there can also be obtained similar advantages to those in the first embodiment.

A fifth embodiment of the present invention will now be described with reference to FIG. 13. This embodiment is practiced for a fuel assembly 17 of 9×9 fuel rod array on condition that the pellet maximum uranium enrichment is set to 4.95 wt%.

Figures 13A, 13B:
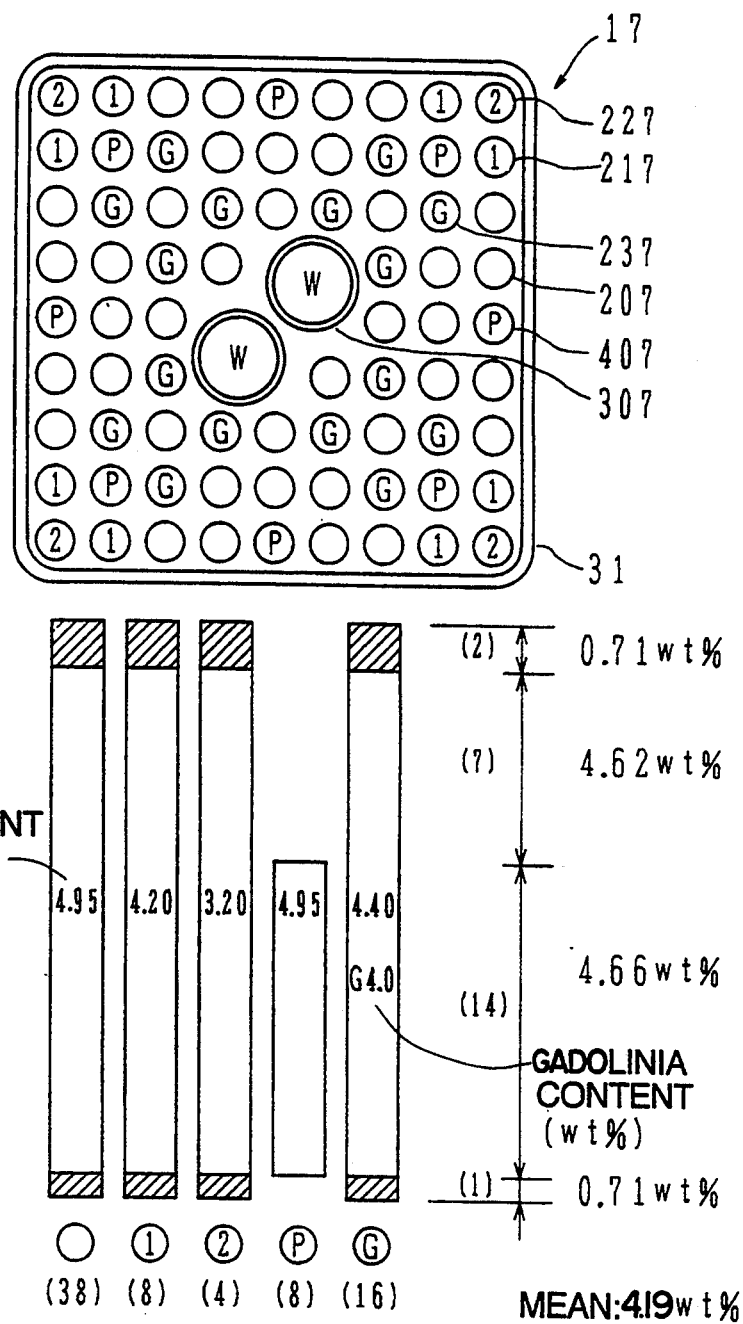
FIG. 13 is a horizontal sectional view of a fuel assembly according to a fifth embodiment of the present invention and constructions of fuel rods in the assembly.
Figures 14A, 14B:
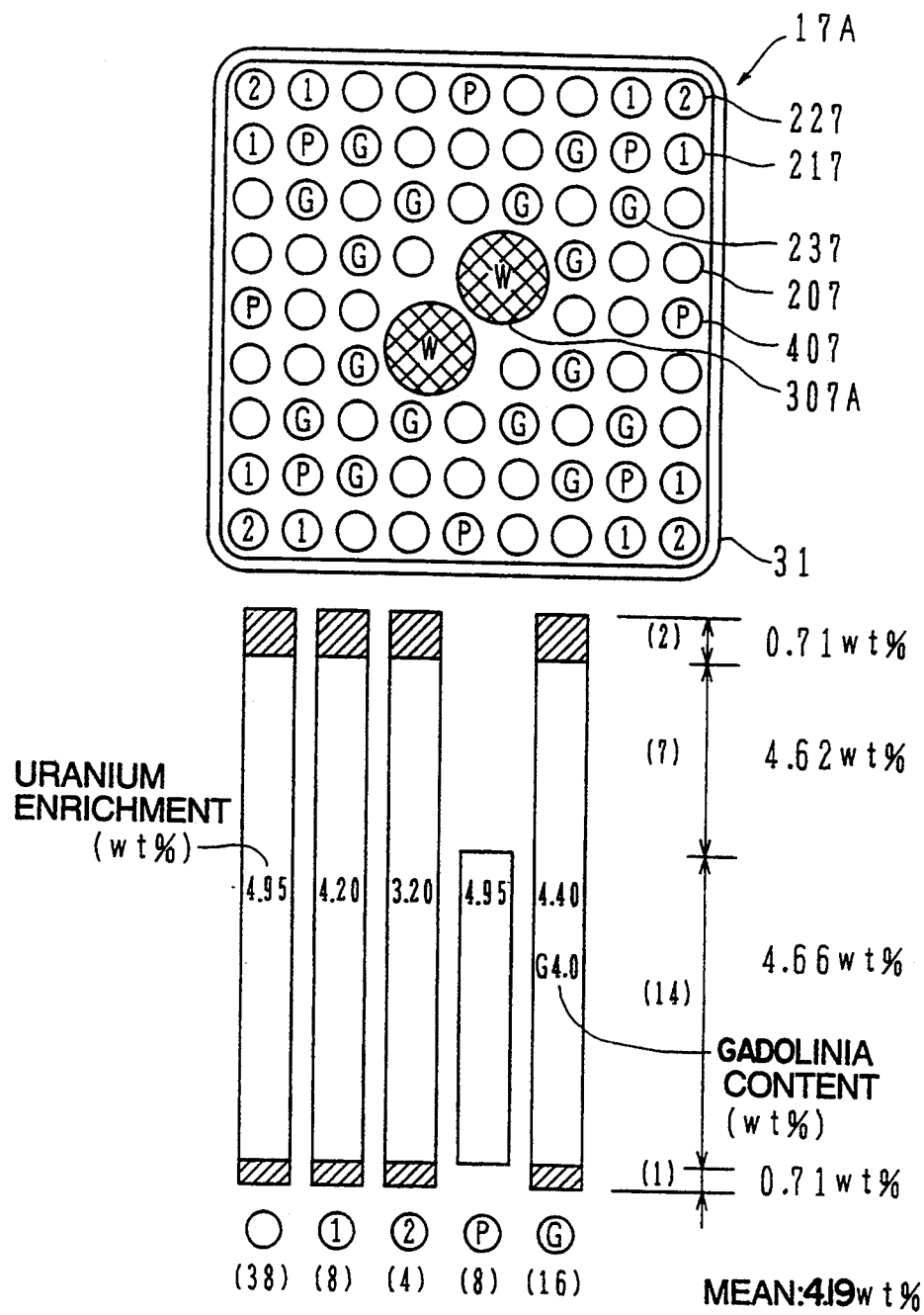
FIG. 14 is a horizontal sectional view of a fuel assembly according to a sixth embodiment of the present invention and constructions of fuel rods in the assembly.

In FIG. 13, the fuel assembly 17 of this embodiment comprises plural kinds of fuel rods 207, 217, 227, 237, 407 and two large-diameter water rods 307, these fuel rods 207 to 237, 407 and water rods 307 being arranged in a channel box 31. Of the above fuel rods, the fuel rods 217, 227 are ones arranged in four corner regions of the fuel assembly 17, the fuel rod 237 is one containing a burnable absorber, i.e., a Gd rod containing gadolinia, and further the fuel rods 207, 407 are ones other than the above fuel rods. Those fuel rods 207 to 237 are each constructed such that fuel pellets having an uniform uranium enrichment are filled in a region of 21/24 nodes of its fuel effective section except an upper end portion of 2/24 nodes and a lower portion of 1/24 node, and a blanket including natural uranium as fuel is formed in each of the upper end portion of 2/24 nodes and the lower portion of 1/24 node. On the other hand, the fuel rod 407 is of a partial length fuel rod shorter than the fuel rods 207 to 237, and its fuel rod effective length section in this embodiment, i.e., a section where the fuel pellets are filled, is located corresponding to 14/24 nodes in the axial direction of the other fuel rods. The partial length fuel rod 407 is provided with no blankets.

The fuel rods 207 are present in number 38 and their pellet uranium enrichment is 4.95 wt%, i.e., the maximum uranium enrichment. The four fuel rods 227 positioned at the four corners each have the pellet uranium enrichment of 3.2 wt%, and the eight fuel rods 217 adjacent the fuel rods 227 each have the pellet uranium enrichment of 4.2 wt%. The Gd rods 237 are present in number 16 and their pellet uranium enrichment is 4.4 wt%. The Gd rods 237 are arranged in regions of the square lattice array of the fuel rods other than the outermost periphery thereof. The enrichment of natural uranium in the blanket regions at the upper and lower end portions is 0.71 wt%. The partial length fuel rods 407 are present in number 8 and their pellet uranium enrichment is 4.95 wt%, i.e., the maximum uranium enrichment, as with the fuel rods 207.

The total number of the fuel rods 207, 217, 227, 237, 407 is 74 and the percentage in number of the Gd rods 237 to all the fuel rods is 16/74=22%. The pellet uranium enrichment 4.4 wt% of the Gd rods 235 is between the pellet maximum uranium enrichment of 4.95 wt% and the pellet minimum uranium enrichment of 3.2 wt%. The total number of the fuel rods except the Gd rods 237 is 58. Of these 58 fuel rods, the percentage in number of the fuel rods 207, 407 having the pellet maximum uranium enrichment is 46/58=79%. In this case, the mean uranium enrichment of the fuel assembly 17 can be raised to 4.19 wt%. Furthermore, the mean cross-sectional uranium enrichment of the fuel assembly 17 in the enriched fuel section except the blanket regions at the upper and lower end portions is 4.66 wt%. The ratio $e_{max}/e_{mean}$ of the pellet maximum uranium enrichment to the cross-sectional mean enrichment is 4.95/4.66=1.06.

The number of the fuel rods except the Gd rods 235 as viewed in cross-sections above the fuel effective length section of each partial length fuel rod 407 is 50. Of these 50 fuel rods, the percentage in number of the fuel rods 207 having the pellet maximum uranium enrichment is 38/50=76%. In this case, the mean cross-sectional uranium enrichment of the fuel assembly 15 in the enriched fuel section except the blanket regions at the upper and lower end portions is 4.62 wt%. The ratio $e_{max}/e_{mean}$ of the pellet maximum uranium enrichment to the cross-sectional mean enrichment is 4.95/4.62=1.07.

The water rods 307 are each of a water rod which has a 2×2 size and is circular in cross-section, with the total moderator cross-sectional area being of 9 cm². These water rods 307 are arranged in a region where total 7 fuel rods can be accommodated.

With this fifth embodiment, there can also be obtained similar advantages to those in the first embodiment. Further, with this fifth embodiment, since the partial length fuel rods 407 are arranged in the outermost periphery of the fuel assembly, the void reactivity coefficient can be reduced to improve a reactivity control effect, as described in Japanese Patent Application No. 4-210539.

A sixth embodiment of the present invention will be described below with reference to FIG. 14 to 17. In this embodiment, the water rods 307 in the embodiment of FIG. 13 are each replaced by a so-called spectral shift rod 307A of which axial water level changes depending on a core flow rate.

Figure 15:
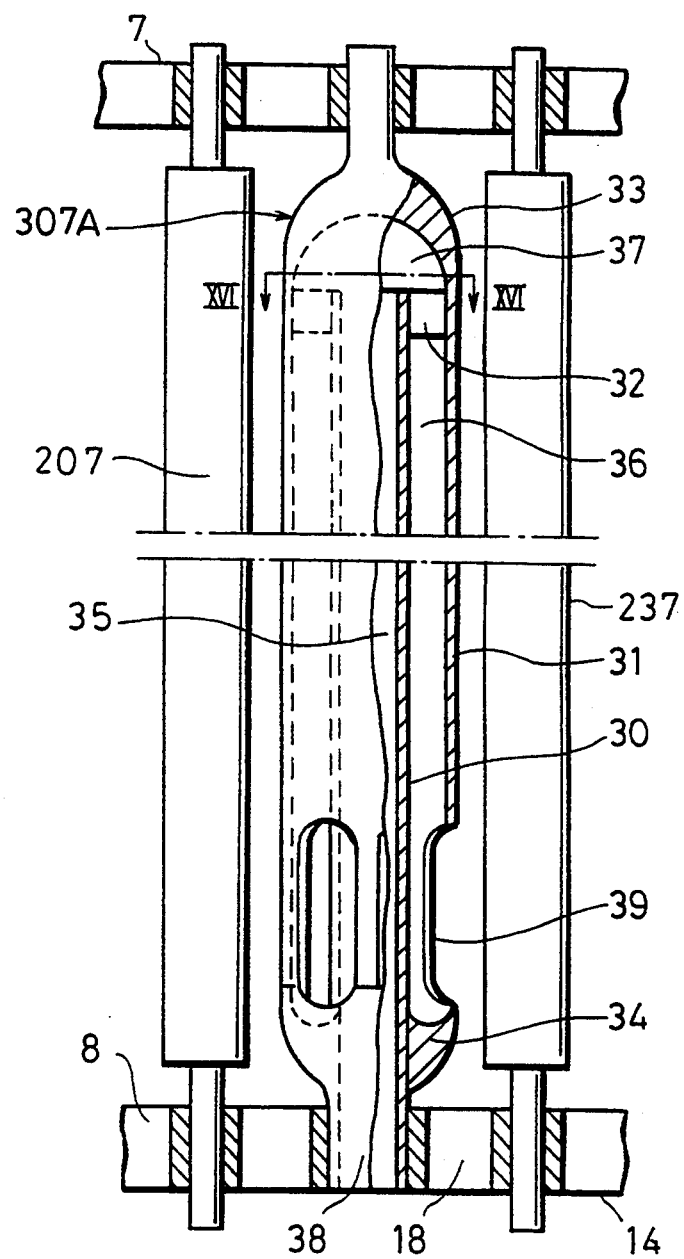
FIG. 15 is a partial sectional front view showing a structure of a spectrum shift rod.
Figure 16:
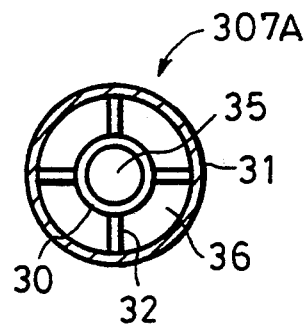
FIG. 16 is a cross-sectional view taken along line XVI—XVI in FIG. 15.
Figure 17:
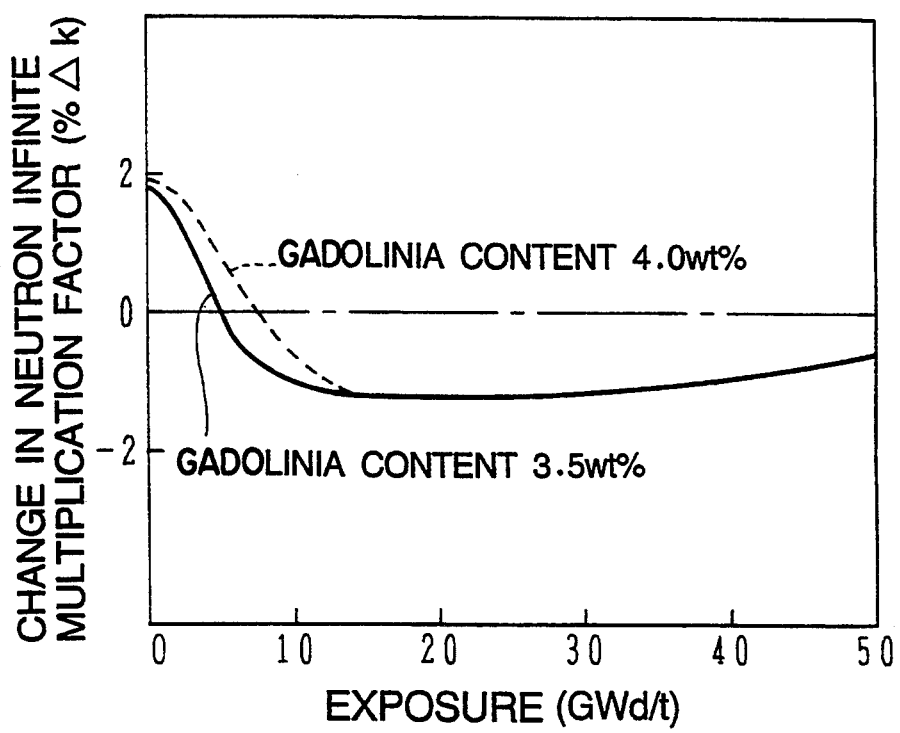
FIG. 17 is a graph showing the relationship between a neutron infinite multiplication factor and an exposure when the vapor volume ratio in the spectrum shift rod is changed from 100% to 0%.

The detailed structure of the spectral shift rod 307A is shown in FIGS. 15 and 16. As described in JP, A, 63-73187, the spectral shift rod 307A comprises an inner pipe 30, an outer pipe 31 and spacers 32. The outer pipe 31 and the inner pipe 30 are arranged in concentrical relation such that the outer pipe 31 entirely surrounds an outer circumference of the inner pipe 30. An upper end of the outer pipe 31 is hermetically closed by a cover portion 33 and an upper end of the cover portion 33 is inserted to and held by an upper tie plate 7. The cover portion 33 gradually narrows a space above the inner pipe 30 so as to define a gap between itself and the upper end of the inner pipe 30. An upper end of the inner pipe 30 is fixed to an inner surface of the outer pipe 31 through the plate-like spacers 32 arranged to radially extend from an axis of the spectral shift rod 307A. A lower end of the outer pipe 31 is closed by a closure 34. A lower end of the inner pipe 30 penetrates through the closure 34 and projects downwardly therefrom. Thus, the lower end of the inner pipe 30 penetrates through a fuel rod support 14 of a lower tie plate 8. A cooling water inlet 38 formed in the lower end of the inner pipe 30 is open to an inner space of the lower tie plate 8. The interior of the inner pipe 30 forms a cooling water rising passage 35, while an annular passage defined between the inner pipe 30 and the outer pipe 31 forms a cooling water falling passage 36. In a wall of the outer pipe 31 in its lower portion, there are formed a plurality of cooling water outlets 39 spaced from each other along a circumference of the outer pipe 31. These cooling water outlets 39 are provided with equal angular intervals therebetween in the circumferential direction. The cooling water outlets 39 are open to a region above the fuel rod support 14. In this embodiment, the fuel rod support 14 also serves as a resisting member. The cooling water rising passage 35 and the cooling water falling passage 36 are interconnected at a return portion 37 formed in an upper end of the spectral shift rod 307A. Thus, the spectral shift rod 307A has therein a cooling water passage, in the form of an inverted-U, built up by the cooling water rising passage 35, the cooling water falling passage 36 and the return portion 37.

When the fuel assembly 17A of this embodiment is loaded into a core of a boiling water reactor (all fuel assemblies being the fuel assemblies 17A) and the boiling water reactor is set into operation, a large part of cooling water is directly introduced to spaces between the fuel rods of the fuel assembly 17A via the inner space of the lower tie plate 8 and penetration holes 18 formed in the fuel rod support 14. The remaining part of the cooling water having flown into the inner space of the low tie plate 8 flows into the cooling water rising passage 35 of the spectral shift rod 307A through the cooling water inlet 38 and, after passing the return portion 37 and the cooling water falling passage 36, it is discharged through the cooling water outlets 39 to the region above the fuel rod support 14. The cooling water discharged through the cooling water outlets 39 takes a phase of liquid or gas (vapor) depending on a flow rate of the cooling water that flows into the spectral shift rod 307A through the cooling water inlet 38. In this embodiment, the pressure loss in the fuel rod support 14 and specifications of the inner pipe 30 and the outer pipe 31 are previously set such that at the core flow rate not greater than 100%, there produces a condition in the spectral shift rod 307A where a liquid level can exist in the cooling water rising passage 35, and at the core flow rate of 110%, there produces a condition in the spectral shift rod 307A where a substantially single-phase flow fills both the cooling water rising passage 35 and the cooling water falling passage 36.

In that way, the spectral shift rod 307A can adjust the neutron moderating effect by changing a water level formed therein depending on the core flow rate and, as a result, it can be utilized to control reactivity or power. Details of this control procedure is described in the above-cited JP, A, 63-73187.

Meanwhile, in a BWR fuel assembly, excess reactivity is controlled by gadolinia, as mentioned above. At the BOC in operation, therefore, an interaction between gadolinia contained in fresh fuel and the spectral shift rod must be taken into consideration. FIG. 16 shows change in the neutron infinite multiplication factor as resulted when the core flow rate is gradually increased from the beginning of exposure so that the vapor volume rate in the spectral shift rod 307A varies from 100% to 0%. It will be seen from the graph of FIG. 16 that, in the initial period of lifetime where gadolinia is present, a water level in the spectral shift rod is lowered and hence the neutron infinite multiplication factor increases inversely. This is attributable to that the neutron moderating effect is impeded and thermal neutron absorption due to gadolinia is reduced. In other words, it will be understood that, to effectively perform reactivity control or power control with a water level in the spectral shift rod, the amount of gadolinia requires to be reduced.

In this embodiment, since the reactivity control ability is enhanced and the shutdown margin is improved by arranging the partial length fuel rods 407, as mentioned above relating to the fifth embodiment, the amount of gadolinia can be reduced. As a result, it is possible to improve fuel economy and achieve the best use of an effect of the spectral shift rod.

A seventh embodiment of the present invention will now be described with reference to FIG. 18. This embodiment is obtained by changing the arrangement of the partial length fuel rods 407 in the fifth embodiment of FIG. 13. More specifically, as shown in FIG. 18, the partial length fuel rods 407 used in a fuel assembly 17A of this embodiment are all in the second layer counter from the outermost layer of lattice fuel array. The other construction is the same as the fifth embodiment of FIG. 13. With this seventh embodiment, there can also be obtained similar advantages to those in the first embodiment.

An eighth embodiment of the present invention will now be described with reference to FIG. 19. This embodiment is practiced for a fuel assembly 19 of $9 \times 9$ fuel rod array on condition that the pellet maximum uranium enrichment is set to 5.0 wt% and water rods are rectangular in cross-section.

Figure 19A:
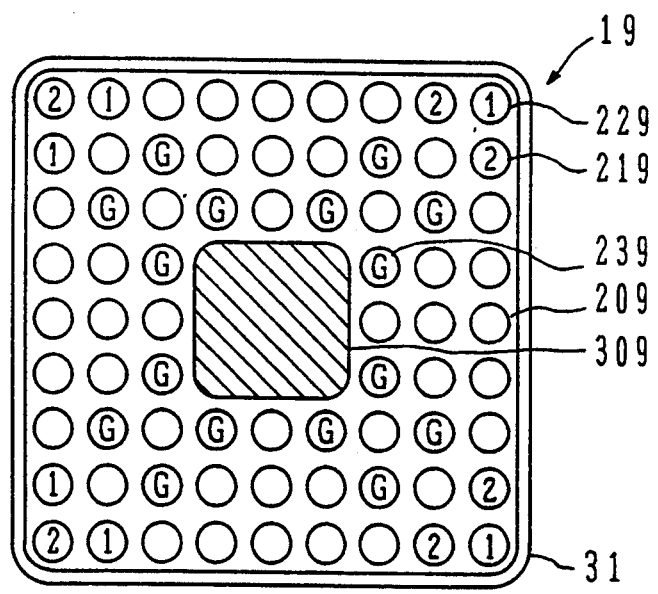
FIG. 19 is a horizontal sectional view of a fuel assembly according to an eighth embodiment of the present invention and constructions of fuel rods in the assembly.
Figures 19B, 19C:
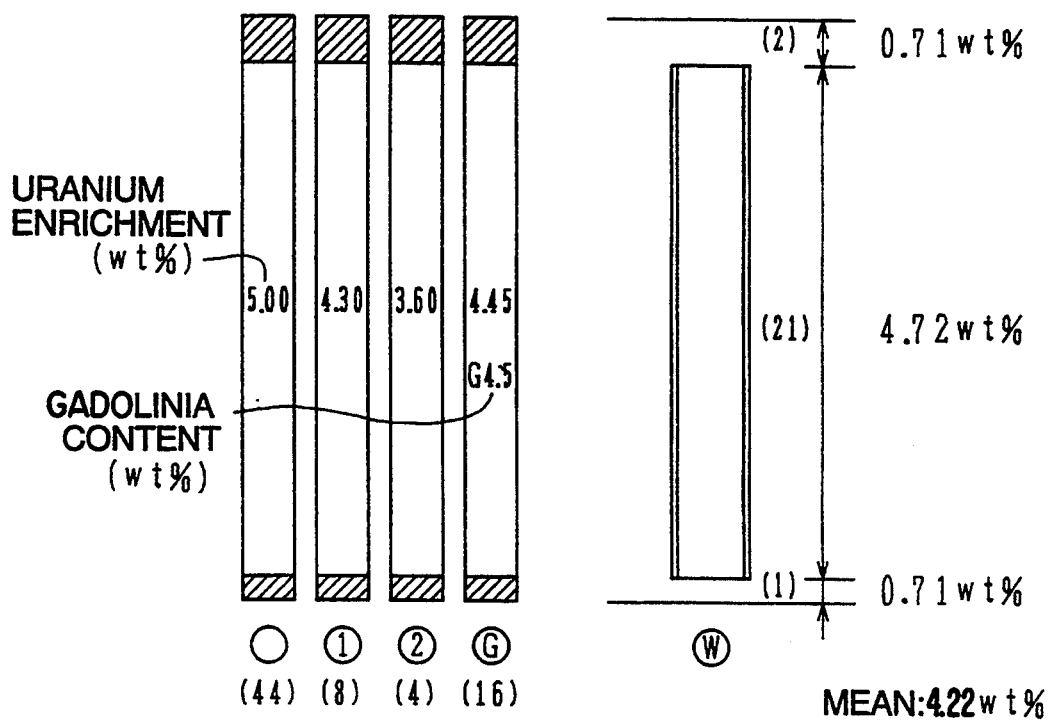

In FIG. 19, the fuel assembly 19 of this embodiment comprises plural kinds of fuel rods 209, 219, 229, 239 and one large-size water rod 309, these fuel rods 209 to 209 and water rod 309 being arranged in a channel box 31. Of the above fuel rods, the fuel rods 219, 229 are ones arranged in four corner regions of the fuel assembly 19, the fuel rod 239 is one containing a burnable absorber, i.e., a Gd rod containing gadolinia, and further the fuel rods 209 is one other than the above fuel rods. Those fuel rods 209 to 239 are each constructed such that fuel pellets having an uniform uranium enrichment are filled in a region of 21/24 nodes of its fuel effective section except an upper end portion of 2/24 nodes and a lower portion of 1/24 node, and a blanket including natural uranium as fuel is formed in each of the upper end portion of 2/24 nodes and the lower portion of 1/24 node.

The fuel rods 209 are present in number 44 and their pellet uranium enrichment is 5.0 wt%, i.e., the maximum uranium enrichment. The four fuel rods 229 positioned at the four corners each have the pellet uranium enrichment of 3.6 wt%, and the eight fuel rods 219 adjacent the fuel rods 229 each have the pellet uranium enrichment of 4.3 wt%. The Gd rods 239 are present in number 16 and their pellet uranium enrichment is 4.45 wt%. The Gd rods 239 are arranged in regions of the square lattice array of the fuel rods other than the outermost periphery thereof. The enrichment of natural uranium in the blanket regions at the upper and lower end portions is 0.71 wt%.

The total number of the fuel rods 209, 219, 229, 239 is 72 and the percentage in number of the Gd rods 239 to all the fuel rods is $16/72 = 22\%$. The pellet uranium enrichment 4.45 wt% of the Gd rods 239 is between the pellet maximum uranium enrichment of 5.0 wt% and the pellet minimum uranium enrichment of 3.6 wt%. The total number of the fuel rods except the Gd rods 239 is 56. Of these 56 fuel rods, the percentage in number of the fuel rods 209 having the pellet maximum uranium enrichment is $44/56 = 79\%$. In this case, the mean uranium enrichment of the fuel assembly 19 can be raised to 4.22 wt%. Furthermore, the mean cross-sectional uranium enrichment of the fuel assembly 19 in the enriched fuel section except the blanket regions at the upper and lower end portions is 4.72 wt%. The ratio $e_{max}/e_{mean}$ of the pellet maximum uranium enrichment to the cross-sectional mean enrichment is $5.0/4.72 = 1.06$.

The water rods 309 being rectangular in cross-section has a $3 \times 3$ size and its total moderator cross-sectional area is 14 cm². The water rod 309 is arranged in a region where total 9 fuel rods can be accommodated.

With this eighth embodiment, there can also be obtained similar advantages to those in the first embodiment.

According to the present invention, as described above, when the maximum uranium enrichment is limited to 5.0 wt%, it is possible to raise the mean uranium enrichment of a fuel assembly and attain the mean discharged exposure not less than 45 GWd/t for achievement of high burn-up while meeting thermal limit values such as a linear heat generation rate, without causing any problems in gadolinia containing fuel rods. Also, such high burn-up enables an improvement in fuel economy and a reduction in number of spent fuel.

What is claimed is:

1. A fuel assembly comprising a multiplicity of fuel rods filled with fuel pellets and arranged into a square lattice array, and at least one neutron moderator rod, the fuel pellets filled in said multiplicity of fuel rods having a maximum uranium enrichment not larger than 5 wt%, said multiplicity of fuel rods including a plurality of first fuel rods including no burnable absorbers and a plurality of second fuel rods including burnable absorbers, wherein:
   (a) a mean uranium enrichment of said multiplicity of fuel rods per fuel assembly is not less than 4 wt%;
   (b) a percentage in number of said second fuel rods to said multiplicity of fuel rods is in the range of 20% to 30%, the uranium enrichment of the fuel pellets filled in said second fuel rods being between the maximum uranium enrichment of the fuel pellets filled in said multiplicity of fuel rods and a minimum uranium enrichment of the fuel pellets filled in said multiplicity of fuel rods; and
   (c) said first fuel rods include a plurality of third fuel rods in which fuel pellets filled in said third fuel rods have a uranium enrichment higher than a mean uranium enrichment in one cross-section of said fuel assembly, a percentage in number of said third fuel rods to said first fuel rods being not less than 75%.

2. A fuel assembly according to claim 1, wherein said multiplicity of fuel rods respectively have regions at upper and lower end portions thereof in which the mean uranium enrichment in one cross-section of said fuel assembly is lower than other region thereof.

3. A fuel assembly according to claim 2, wherein said regions of the upper and lower end portions include blankets of natural uranium.

4. A fuel assembly according to claim 2, wherein a ratio of the maximum uranium enrichment of said fuel pellets to the mean uranium enrichment in one cross-section of said fuel assembly in said other region is not larger than 1.16.

5. A fuel assembly according to any one of claims 1 to 4, wherein the mean uranium enrichment in one cross-section of said fuel assembly is not less than 4.5 wt%.

6. A fuel assembly according to any one of claims 1 to 4, wherein the mean uranium enrichment in one cross-section of said fuel assembly is not less than 4.8 wt%.

7. A fuel assembly according to claim 1, wherein said second fuel rods are arranged in regions of said square lattice array except the outermost periphery thereof.

8. A fuel assembly according to claim 1, wherein the uranium enrichment of the fuel pellets filled in all said third fuel rods is equal to the maximum uranium enrichment of said fuel pellets.

9. A fuel assembly according to claim 1, wherein a percentage in number of said third fuel rods to said first fuel rods is not less than 80%.

10. A fuel assembly according to claim 1, wherein said first fuel rods include a plurality of fourth fuel rods in which fuel pellets filled in said fourth fuel rods has a uranium enrichment lower than the mean uranium enrichment in one cross-section of said fuel assembly, said fourth fuel rods being arranged in corner regions of said square lattice array.

11. A fuel assembly according to claim 1, wherein said neutron moderator rod or rods have a moderator cross-sectional area of 7 to 14 cm$^2$.

12. A fuel assembly according to claim 1, wherein said neutron moderator rod or rods are arranged in a region capable of accommodating said fuel rods in number 7 to 17.

13. A fuel assembly according to claim 1, wherein said neutron moderator rod or rods are a spectral shift rod of which axial water level changes depending on a core flow rate.

14. A fuel assembly according to claim 1, wherein said multiplicity of fuel rods has a lattice array of 9×9 or more.

15. A fuel assembly comprising a multiplicity of fuel rods filled with fuel pellets and arranged into a square lattice array, and at least one neutron moderator rod, the fuel pellets filled in said multiplicity of fuel rods having a maximum uranium enrichment not larger than 5 wt%, said multiplicity of fuel rods including a plurality of first fuel rods including no burnable absorbers and a plurality of second fuel rods including burnable absorbers, wherein:
   (a) said multiplicity of fuel rods each have regions of upper and lower end portions thereof in which a mean uranium enrichment in one cross-section of said fuel assembly is lower than other region thereof;
   (b) a ratio of the maximum uranium enrichment of said fuel pellets to the mean uranium enrichment in one cross-section of said fuel assembly in said other region is not larger than 1.16;
   a percentage in number of said second fuel rods to said multiplicity of fuel rods is in the range of 20% to 30%, the uranium enrichment of the fuel pellets filled in said other region of each said second fuel rod being between the maximum uranium enrichment of the fuel pellets filled in said multiplicity of fuel rods and a minimum uranium enrichment of the fuel pellets filled in said multiplicity of fuel rods; and
   (d) said first fuel rods include a plurality of third fuel rods in which fuel pellets filled in said other region of each of said third fuel rod have a uranium enrichment higher than the mean uranium enrichment in one cross-section of said fuel assembly in said other region, a percentage in number of said third fuel rods to said first fuel rods being not less than 75%.

16. A fuel assembly according to claim 15, wherein said regions of the upper and lower end portions include blankets of natural uranium.

17. A fuel assembly according to claim 15, wherein said region of the upper end portion is 2/24 nodes, said region of the lower end portion is 1/24 node, and the mean uranium enrichment in one cross-section of said fuel assembly in said other region is not less than 4.5 wt%.

18. A fuel assembly according to claim 15, wherein said regions of the upper and lower end portions are each 1/24 node, and the mean uranium enrichment in one cross-section of said fuel assembly in said other region is not less than 4.3 wt%.

19. A reactor core using light water as a coolant, wherein said core includes a fuel assembly according to any one of claims 1 to 4 and 7 to 18.

20. A reactor core using light water as a coolant, wherein said core includes a fuel assembly according to claim 5.

21. A reactor core using light water as a coolant, wherein said core includes a fuel assembly according to claim 6.

* * * * *